US010294614B2

(12) United States Patent
Nonni et al.

(10) Patent No.: US 10,294,614 B2
(45) Date of Patent: *May 21, 2019

(54) LOW VISCOSITY KRAFT FIBER HAVING AN ENHANCED CARBOXYL CONTENT AND METHODS OF MAKING AND USING THE SAME

(71) Applicant: GP Cellulose GmbH, Zug (CH)

(72) Inventors: Arthur J. Nonni, Peachtree City, GA (US); Charles E. Courchene, Snellville, GA (US); Blair R. Carter, Marietta, GA (US)

(73) Assignee: GP Cellulose GmbH, Zug (CH)

( * ) Notice: Subject to any disclaimer, the term of this patent is extended or adjusted under 35 U.S.C. 154(b) by 236 days.

This patent is subject to a terminal disclaimer.

(21) Appl. No.: 15/125,276

(22) PCT Filed: Mar. 9, 2015

(86) PCT No.: PCT/US2015/019479
§ 371 (c)(1),
(2) Date: Sep. 12, 2016

(87) PCT Pub. No.: WO2015/138335
PCT Pub. Date: Sep. 17, 2015

(65) Prior Publication Data
US 2017/0073892 A1  Mar. 16, 2017
US 2019/0112758 A9  Apr. 18, 2019

Related U.S. Application Data

(63) Continuation-in-part of application No. PCT/IB2014/001272, filed on Mar. 12, 2014.

(51) Int. Cl.
| | | |
|---|---|---|
| *D21C 9/16* | (2006.01) | |
| *D21C 9/14* | (2006.01) | |
| *C08B 15/04* | (2006.01) | |
| *B01J 20/24* | (2006.01) | |
| *C08B 15/00* | (2006.01) | |
| *D21C 9/00* | (2006.01) | |
| *D21C 9/147* | (2006.01) | |
| *D21H 11/20* | (2006.01) | |
| *D21C 3/02* | (2006.01) | |

(52) U.S. Cl.
CPC ............. *D21C 9/163* (2013.01); *B01J 20/24* (2013.01); *C08B 15/00* (2013.01); *C08B 15/04* (2013.01); *D21C 3/02* (2013.01); *D21C 9/004* (2013.01); *D21C 9/142* (2013.01); *D21C 9/147* (2013.01); *D21H 11/20* (2013.01); *Y10T 428/298* (2015.01)

(58) Field of Classification Search
CPC ........ D21C 9/16; D21C 9/163; D21C 9/1036; D21C 9/002
See application file for complete search history.

(56) References Cited

U.S. PATENT DOCUMENTS

| | | |
|---|---|---|
| 1,298,552 A | 3/1919 | Ornstein |
| 1,298,553 A | 3/1919 | Ornstein |
| 1,298,554 A | 3/1919 | Ornstein |
| 1,860,431 A | 5/1932 | Richter |
| 2,112,116 A | 3/1938 | Richter |
| 2,178,696 A | 11/1939 | Muskat et al. |
| 2,212,338 A | 8/1940 | Bown |
| 2,368,527 A | 1/1945 | Edelstein |
| 2,512,338 A | 6/1950 | Klug et al. |
| 2,749,336 A | 6/1956 | Boddicker et al. |
| 2,975,169 A | 3/1961 | Cranford et al. |
| 2,978,446 A | 4/1961 | Battista et al. |
| 3,251,731 A | 5/1966 | Gard et al. |
| 3,308,012 A | 3/1967 | Tobar |
| 3,313,641 A | 4/1967 | Borchert |
| 3,707,148 A | 12/1972 | Bryce |
| 3,728,213 A | 4/1973 | Hinz |
| 3,728,331 A | 4/1973 | Savage |
| 3,868,955 A | 3/1975 | Steiger et al. |
| 3,975,206 A | 8/1976 | Lotzgesell et al. |
| 4,022,965 A | 5/1977 | Goheen et al. |
| 4,100,094 A | 7/1978 | Burns et al. |
| 4,222,819 A | 9/1980 | Fossum et al. |
| 4,270,976 A | 6/1981 | Sandstrom et al. |
| 4,372,314 A | 2/1983 | Wall |
| 4,410,397 A | 10/1983 | Kempf |
| 4,427,490 A | 1/1984 | Eckert |
| 4,444,621 A | 4/1984 | Lindahl |
| 4,454,005 A | 6/1984 | Stofko et al. |
| 4,470,212 A | 9/1984 | Stafford et al. |
| 4,599,138 A | 7/1986 | Lindahl |
| 4,614,646 A | 9/1986 | Christiansen |
| 4,619,663 A | 10/1986 | Tatin |
| 4,661,205 A | 4/1987 | Ow et al. |
| H479 H | 6/1988 | Wood et al. |
| 4,756,799 A | 7/1988 | Bengtsson et al. |
| 4,783,239 A | 11/1988 | Rich |
| 4,838,944 A | 6/1989 | Kruger |
| 4,869,783 A | 9/1989 | Prusas et al. |

(Continued)

FOREIGN PATENT DOCUMENTS

| | | |
|---|---|---|
| AU | B-53648/90 | 7/1992 |
| CA | 1129161 | 8/1982 |

(Continued)

OTHER PUBLICATIONS

Jameel et al., Effects of Ozone and Chlorine Dioxide on the Chemical Properties of Cellulose Fibers, 2004, Journal of Applied Polymer Science, vol. 93, p. 1219-1223.*

(Continued)

*Primary Examiner* — Anthony Calandra
(74) *Attorney, Agent, or Firm* — Finnegan, Henderson, Farabow, Garrett & Dunner, LLP; Jeffrey A. Freeman; Ram W. Sabnis

(57) ABSTRACT

A pulp fiber with an enhanced carboxyl content resulting in improved antimicrobial, anti-yellowing and absorptive properties. Methods for making the kraft pulp fiber and products made from it are also described.

20 Claims, No Drawings

(56) References Cited

U.S. PATENT DOCUMENTS

| | | |
|---|---|---|
| 4,875,974 A | 10/1989 | Rich |
| 4,889,595 A | 12/1989 | Herron et al. |
| 5,002,635 A | 3/1991 | Gentile, Jr. et al. |
| 5,015,245 A | 5/1991 | Noda |
| 5,026,589 A | 6/1991 | Schechtman |
| 5,087,324 A | 2/1992 | Awofeso et al. |
| 5,284,703 A | 2/1994 | Everhart et al. |
| 5,296,099 A | 3/1994 | Griggs et al. |
| 5,300,358 A | 4/1994 | Evers |
| 5,302,248 A | 4/1994 | Weinstock et al. |
| H1340 H | 7/1994 | Yetter et al. |
| 5,346,589 A | 9/1994 | Braunstein et al. |
| 5,383,964 A | 1/1995 | Suc et al. |
| 5,441,603 A | 8/1995 | Griggs et al. |
| 5,447,602 A | 9/1995 | Sajbel et al. |
| 5,460,924 A | 10/1995 | Buchanan et al. |
| 5,480,984 A | 1/1996 | Angerer et al. |
| 5,522,967 A | 6/1996 | Shet |
| 5,529,662 A | 6/1996 | Tan et al. |
| 5,536,625 A | 7/1996 | Buchanan et al. |
| 5,552,019 A | 9/1996 | Weinstock et al. |
| 5,558,658 A | 9/1996 | Menard et al. |
| 5,562,645 A | 10/1996 | Tanzer et al. |
| 5,580,485 A | 12/1996 | Feringa et al. |
| 5,593,543 A | 1/1997 | Balos et al. |
| 5,607,546 A | 3/1997 | Hoglund et al. |
| 5,630,906 A | 5/1997 | Boe et al. |
| 5,639,348 A | 6/1997 | Payton et al. |
| 5,698,688 A | 12/1997 | Smith et al. |
| 5,703,225 A | 12/1997 | Shet et al. |
| 5,766,159 A | 6/1998 | Martin et al. |
| 5,708,618 A | 7/1998 | Banker et al. |
| 5,853,428 A | 12/1998 | Collins et al. |
| 5,863,389 A | 1/1999 | White et al. |
| 5,876,625 A | 3/1999 | Collins et al. |
| 5,994,531 A | 11/1999 | Doenges et al. |
| 6,010,594 A | 1/2000 | Henricson et al. |
| 6,048,437 A | 4/2000 | Fukushima et al. |
| 6,063,982 A | 5/2000 | Martin et al. |
| 6,099,586 A | 8/2000 | Collins et al. |
| 6,100,441 A | 8/2000 | Blomstrom et al. |
| 6,136,223 A | 10/2000 | Collins et al. |
| 6,146,494 A | 11/2000 | Seger et al. |
| 6,165,318 A | 12/2000 | Paren et al. |
| 6,210,801 B1 | 4/2001 | Luo et al. |
| 6,214,164 B1 | 4/2001 | Rantala |
| 6,214,976 B1 | 4/2001 | Watanabe et al. |
| 6,221,487 B1 | 4/2001 | Luo et al. |
| 6,228,126 B1 | 5/2001 | Cimecioglu et al. |
| 6,235,392 B1 | 5/2001 | Luo et al. |
| 6,241,779 B1 | 6/2001 | Collins et al. |
| 6,258,207 B1 | 6/2001 | Pan |
| 6,302,997 B1 | 10/2001 | Hurter et al. |
| 6,306,253 B2 | 10/2001 | Henricson |
| 6,306,334 B1 | 10/2001 | Luo et al. |
| 6,319,361 B1 | 11/2001 | Smith et al. |
| 6,331,354 B1 | 12/2001 | Sealey, II et al. |
| 6,368,456 B1 | 4/2002 | Cimecioglu et al. |
| 6,379,494 B1 | 4/2002 | Jewell et al. |
| 6,398,908 B1 | 6/2002 | Hermansson et al. |
| 6,399,854 B1 | 6/2002 | Vartiainen |
| 6,432,266 B1 | 8/2002 | Fukushima et al. |
| 6,436,238 B1 | 8/2002 | Pitkanen et al. |
| 6,440,523 B1 | 8/2002 | Sealey, II et al. |
| 6,440,547 B1 | 8/2002 | Luo et al. |
| 6,444,314 B1 | 9/2002 | Luo et al. |
| 6,458,245 B1 | 10/2002 | Hoglund et al. |
| 6,471,727 B2 | 10/2002 | Luo et al. |
| 6,471,824 B1 | 10/2002 | Jewell |
| 6,491,788 B2 | 12/2002 | Sealey, II et al. |
| 6,511,930 B1 | 1/2003 | Luo et al. |
| 6,514,380 B1 | 2/2003 | Laine et al. |
| 6,514,613 B2 | 2/2003 | Luo et al. |
| 6,515,049 B1 | 2/2003 | Doenges et al. |
| 6,518,419 B1 | 2/2003 | Van Der Lugt et al. |
| 6,524,348 B1 | 2/2003 | Jewell et al. |
| 6,528,163 B2 | 3/2003 | Sealey, II et al. |
| 6,540,876 B1 | 4/2003 | Cimecioglu et al. |
| 6,541,627 B1 | 4/2003 | Ono et al. |
| 6,562,195 B2 | 5/2003 | Cimecioglu et al. |
| 6,579,414 B2 | 6/2003 | Jewell |
| 6,582,559 B2 | 6/2003 | Thornton et al. |
| 6,586,588 B1 | 7/2003 | Cimecioglu et al. |
| 6,596,033 B1 | 7/2003 | Luo et al. |
| 6,605,181 B1 | 8/2003 | Bergqvist et al. |
| 6,605,350 B1 | 8/2003 | Sealey, II et al. |
| 6,627,749 B1 | 9/2003 | Kumar |
| 6,632,328 B2 | 10/2003 | Wan et al. |
| 6,635,755 B1 | 10/2003 | Jaschinski et al. |
| 6,685,856 B2 | 2/2004 | Sealey, II et al. |
| 6,686,039 B2 | 2/2004 | Sealey, II et al. |
| 6,686,040 B2 | 2/2004 | Sealey, II et al. |
| 6,686,464 B1 | 2/2004 | Harding et al. |
| 6,689,378 B1 | 2/2004 | Sun et al. |
| 6,692,827 B2 | 2/2004 | Luo et al. |
| 6,695,950 B1 | 2/2004 | Cimecioglu et al. |
| 6,699,358 B1 | 3/2004 | Evans et al. |
| 6,706,237 B2 | 3/2004 | Luo et al. |
| 6,706,876 B2 | 3/2004 | Luo et al. |
| 6,716,976 B1 | 4/2004 | Jetten et al. |
| 6,743,332 B2 | 6/2004 | Haynes et al. |
| 6,765,042 B1 | 7/2004 | Thornton et al. |
| 6,770,168 B1 | 8/2004 | Stigsson |
| 6,770,576 B2 | 8/2004 | Cook et al. |
| 6,770,755 B1 | 8/2004 | Gunnars et al. |
| 6,773,552 B1 | 8/2004 | Albert et al. |
| 6,773,648 B2 | 8/2004 | Luo et al. |
| 6,793,686 B2 | 9/2004 | Cimecioglu et al. |
| 6,797,113 B2 | 9/2004 | Sealey, II et al. |
| 6,821,383 B2 | 11/2004 | Shore et al. |
| 6,824,645 B2 | 11/2004 | Jaschinski et al. |
| 6,849,156 B2 | 2/2005 | Besemer et al. |
| 6,852,904 B2 | 2/2005 | Sun et al. |
| 6,861,023 B2 | 3/2005 | Sealey, II et al. |
| 6,872,821 B2 | 3/2005 | Cimecioglu et al. |
| 6,881,299 B2 | 4/2005 | Parrish et al. |
| 6,896,725 B2 | 5/2005 | Thornton et al. |
| 6,916,402 B2 | 7/2005 | Shannon et al. |
| 6,916,466 B2 | 7/2005 | Besemer et al. |
| 6,919,447 B2 | 7/2005 | Komen et al. |
| 6,923,889 B2 | 8/2005 | Huuskonen et al. |
| 6,924,369 B2 | 8/2005 | Doenges et al. |
| 6,936,710 B2 | 8/2005 | Bragt et al. |
| 6,939,961 B1 | 9/2005 | Schlesiger |
| 6,958,108 B1 | 10/2005 | Vuorinen |
| 6,987,181 B2 | 1/2006 | Jaschinski et al. |
| 7,001,483 B2 | 2/2006 | Severeid et al. |
| 7,019,191 B2 | 3/2006 | Looney et al. |
| 7,022,837 B2 | 4/2006 | Harding et al. |
| 7,067,444 B2 | 6/2006 | Luo et al. |
| 7,083,704 B2 | 8/2006 | Sealey, II et al. |
| 7,090,744 B2 | 8/2006 | Sealey, II et al. |
| 7,094,317 B2 | 8/2006 | Lundberg et al. |
| 7,109,325 B2 | 9/2006 | Komen et al. |
| 7,135,557 B2 | 11/2006 | Weerawarna et al. |
| 7,161,005 B2 | 1/2007 | Schlingloff et al. |
| 7,247,722 B2 | 7/2007 | Cimecioglu et al. |
| 7,252,837 B2 | 8/2007 | Guo et al. |
| 7,279,071 B2 | 10/2007 | Williams et al. |
| 7,279,177 B2 | 10/2007 | Looney et al. |
| 7,326,317 B2 | 2/2008 | Westermark et al. |
| 7,390,566 B2 | 6/2008 | Luo et al. |
| 7,411,110 B2 | 8/2008 | Sawyer et al. |
| 7,455,902 B2 | 11/2008 | Weerawarna et al. |
| 7,456,285 B2 | 11/2008 | Schlingloff et al. |
| 7,520,958 B2 | 4/2009 | Tan et al. |
| 7,541,396 B2 | 6/2009 | Luo et al. |
| 7,589,051 B2 | 9/2009 | Erazo-Majewicz et al. |
| 7,608,167 B2 | 10/2009 | Luo et al. |
| 7,692,004 B2 | 4/2010 | Schlingloff et al. |
| 7,700,764 B2 | 4/2010 | Heijnesson-Hulten |
| 7,708,214 B2 | 5/2010 | Medoff |
| 7,727,945 B2 | 6/2010 | Rodrigues et al. |
| 7,867,358 B2 | 1/2011 | Medoff |

(56) References Cited

U.S. PATENT DOCUMENTS

| | | | |
|---|---|---|---|
| 7,867,359 B2 | 1/2011 | Medoff | |
| 7,939,101 B2 | 5/2011 | Obae et al. | |
| 7,947,292 B2 | 5/2011 | Besemer et al. | |
| 7,955,536 B2 | 6/2011 | Sawyer et al. | |
| 7,971,809 B2 | 7/2011 | Medoff | |
| 7,976,676 B2 | 7/2011 | Yin et al. | |
| 8,007,635 B2 | 8/2011 | Tan et al. | |
| 8,029,896 B2 | 10/2011 | Kumamoto et al. | |
| 8,044,013 B2 | 10/2011 | Schlingloff et al. | |
| 8,057,636 B2 | 11/2011 | Vinson et al. | |
| 8,084,391 B2 | 12/2011 | Weerawarna | |
| 8,282,774 B2 | 10/2012 | Tan et al. | |
| 8,372,765 B2 | 2/2013 | Braig et al. | |
| 8,497,410 B2 | 7/2013 | Leithem et al. | |
| 8,641,863 B2 | 2/2014 | Weerawarna | |
| 9,328,459 B2 | 5/2016 | Weerawarna | |
| 9,926,666 B2* | 3/2018 | Nonni | D21C 9/163 |
| 2001/0025695 A1 | 10/2001 | Patt et al. | |
| 2001/0028955 A1 | 10/2001 | Luo et al. | |
| 2001/0050153 A1 | 12/2001 | Wajer et al. | |
| 2002/0005262 A1 | 1/2002 | Cimecioglu et al. | |
| 2002/0034638 A1 | 3/2002 | Sealy, II et al. | |
| 2002/0098317 A1 | 7/2002 | Jaschinski et al. | |
| 2002/0134521 A1 | 9/2002 | Shannon et al. | |
| 2002/0144796 A1 | 10/2002 | Wan et al. | |
| 2002/0165110 A1 | 11/2002 | Reinhardt et al. | |
| 2003/0019596 A1 | 1/2003 | Ragauskas et al. | |
| 2003/0024661 A1 | 2/2003 | Shore et al. | |
| 2003/0026828 A1 | 2/2003 | Besemer et al. | |
| 2003/0084983 A1 | 5/2003 | Rangachari et al. | |
| 2003/0208175 A1 | 11/2003 | Gross et al. | |
| 2004/0024375 A1 | 2/2004 | Litvay | |
| 2004/0101546 A1 | 5/2004 | Gorman et al. | |
| 2004/0118533 A1 | 6/2004 | Shannon et al. | |
| 2004/0154761 A1 | 8/2004 | Duggirala et al. | |
| 2004/0154765 A1 | 8/2004 | Huuskonen et al. | |
| 2004/0166144 A1 | 8/2004 | Besemer et al. | |
| 2004/0260082 A1 | 12/2004 | Van Der Wilden et al. | |
| 2004/0265371 A1 | 12/2004 | Looney et al. | |
| 2005/0028952 A1 | 2/2005 | Severeid | |
| 2005/0028956 A1 | 2/2005 | Winslow | |
| 2005/0051288 A1 | 3/2005 | Yin | |
| 2005/0061455 A1 | 3/2005 | Tan et al. | |
| 2005/0084412 A1 | 4/2005 | MacDonald et al. | |
| 2006/0004335 A1 | 1/2006 | Wang et al. | |
| 2006/0065377 A1 | 3/2006 | Luo | |
| 2006/0070711 A1 | 4/2006 | Luo | |
| 2006/0144535 A1 | 7/2006 | Nguyen et al. | |
| 2006/0159733 A1 | 7/2006 | Pendharkar et al. | |
| 2006/0260773 A1 | 11/2006 | Tan et al. | |
| 2007/0000627 A1 | 1/2007 | Tan et al. | |
| 2007/0051481 A1 | 3/2007 | Tan et al. | |
| 2007/0119556 A1 | 5/2007 | Tan et al. | |
| 2007/0125507 A1 | 6/2007 | Walter et al. | |
| 2007/0143932 A1 | 6/2007 | Buchert et al. | |
| 2007/0163735 A1 | 7/2007 | Buchert et al. | |
| 2007/0190110 A1 | 8/2007 | Pameijer et al. | |
| 2007/0199668 A1 | 8/2007 | Scarpello et al. | |
| 2007/0272377 A1 | 11/2007 | Mei et al. | |
| 2008/0188636 A1 | 8/2008 | Argyropoulos et al. | |
| 2008/0294132 A1 | 11/2008 | Tan et al. | |
| 2008/0308239 A1 | 12/2008 | Hart et al. | |
| 2009/0044345 A1 | 2/2009 | Schlingloff et al. | |
| 2009/0054863 A1 | 2/2009 | Tan et al. | |
| 2009/0165968 A1 | 7/2009 | Tan et al. | |
| 2009/0312537 A1 | 12/2009 | Medoff | |
| 2010/0055437 A1 | 3/2010 | Fink et al. | |
| 2010/0124583 A1 | 5/2010 | Medoff | |
| 2010/0206501 A1 | 8/2010 | Medoff | |
| 2010/0233481 A1 | 9/2010 | Isogai et al. | |
| 2010/0282422 A1 | 11/2010 | Miyawaki et al. | |
| 2010/0316863 A1 | 12/2010 | Kumamoto et al. | |
| 2010/0320156 A1 | 12/2010 | Olaiya et al. | |
| 2011/0034891 A1* | 2/2011 | Jiang | D21C 9/001 604/358 |
| 2011/0139383 A1 | 6/2011 | Medoff | |
| 2011/0287275 A1 | 11/2011 | Tan et al. | |
| 2012/0004194 A1 | 1/2012 | Lu et al. | |
| 2012/0175073 A1 | 7/2012 | Nonni et al. | |
| 2013/0066291 A1 | 3/2013 | Tan et al. | |
| 2013/0338250 A1 | 12/2013 | Umemoto | |

FOREIGN PATENT DOCUMENTS

| | | |
|---|---|---|
| CA | 1190360 | 7/1985 |
| CA | 2469922 | 6/2004 |
| DE | 19620241 | 11/1997 |
| DE | 10123665 | 11/2002 |
| EP | 0091412 | 10/1983 |
| EP | 0172135 | 2/1986 |
| EP | 0480469 | 4/1992 |
| EP | 0716182 | 6/1996 |
| EP | 0647158 | 8/1997 |
| EP | 0845966 | 3/2000 |
| EP | 0999222 | 5/2000 |
| EP | 1077282 | 2/2001 |
| EP | 1077285 | 2/2001 |
| EP | 1106732 | 6/2001 |
| EP | 1154074 | 11/2001 |
| EP | 1156065 | 11/2001 |
| EP | 1093467 | 3/2002 |
| EP | 0889997 | 7/2002 |
| EP | 0923635 | 2/2003 |
| EP | 1300420 | 4/2003 |
| EP | 0787231 | 5/2003 |
| EP | 1228099 | 9/2003 |
| EP | 1025305 | 11/2003 |
| EP | 1068376 | 11/2003 |
| EP | 0511695 | 6/2004 |
| EP | 1424085 | 6/2004 |
| EP | 1430911 | 6/2004 |
| EP | 1155039 | 7/2004 |
| EP | 0863158 | 11/2004 |
| EP | 1077286 | 2/2005 |
| EP | 1505198 | 2/2005 |
| EP | 1541590 | 6/2005 |
| EP | 1278913 | 11/2005 |
| EP | 1155040 | 4/2006 |
| EP | 1383857 | 5/2006 |
| EP | 1245722 | 6/2006 |
| EP | 1230456 | 7/2006 |
| EP | 1676863 | 7/2006 |
| EP | 1311717 | 8/2006 |
| EP | 1137672 | 12/2006 |
| EP | 1743906 | 1/2007 |
| EP | 1668180 | 8/2007 |
| EP | 1862587 | 12/2007 |
| EP | 2084325 | 4/2010 |
| EP | 2216345 | 8/2010 |
| EP | 2226414 | 9/2010 |
| EP | 2236665 | 10/2010 |
| EP | 1694711 | 12/2010 |
| EP | 1583567 | 3/2012 |
| FR | 2688787 | 9/1993 |
| GB | 555985 | 9/1943 |
| JP | 2001115389 | 4/2001 |
| JP | 2003-026701 | 1/2003 |
| JP | 2003-096681 | 4/2003 |
| WO | WO 1992/014760 | 9/1992 |
| WO | WO 1994/020673 | 9/1994 |
| WO | WO 1994/021690 | 9/1994 |
| WO | WO 1995/006157 | 3/1995 |
| WO | WO 1995/026438 | 10/1995 |
| WO | WO 1995/034628 | 12/1995 |
| WO | WO 1995/035406 | 12/1995 |
| WO | WO 1995/035408 | 12/1995 |
| WO | WO 1996/009434 | 3/1996 |
| WO | WO 1996/020667 | 7/1996 |
| WO | WO 1996/038111 | 12/1996 |
| WO | WO 1997/022749 | 6/1997 |
| WO | WO 1997/030208 | 8/1997 |
| WO | WO 1998/003626 | 1/1998 |
| WO | WO 1998/056981 | 12/1998 |
| WO | WO 1999/009244 | 2/1999 |

(56) References Cited

FOREIGN PATENT DOCUMENTS

| | | |
|---|---|---|
| WO | WO 1999/047733 | 9/1999 |
| WO | WO 1999/057158 | 11/1999 |
| WO | WO 1999/057370 | 11/1999 |
| WO | WO 2000/026257 | 5/2000 |
| WO | WO 2000/032245 | 6/2000 |
| WO | WO 2000/039389 | 7/2000 |
| WO | WO 2000/047812 | 8/2000 |
| WO | WO 2000/050462 | 8/2000 |
| WO | WO 2000/050463 | 8/2000 |
| WO | WO 2000/065145 | 11/2000 |
| WO | WO 2001/029309 | 4/2001 |
| WO | WO 2001/034656 | 5/2001 |
| WO | WO 2001/034657 | 5/2001 |
| WO | WO 2001/083887 | 11/2001 |
| WO | WO 2001/088236 | 11/2001 |
| WO | WO 2002/048196 | 6/2002 |
| WO | WO 2002/048197 | 6/2002 |
| WO | WO 2002/049565 | 6/2002 |
| WO | WO 2002/086206 | 10/2002 |
| WO | WO 2002/088289 | 11/2002 |
| WO | WO 2002/095129 | 11/2002 |
| WO | WO 2003/006739 | 1/2003 |
| WO | WO 2003/042451 | 5/2003 |
| WO | WO 2003/051410 | 6/2003 |
| WO | WO 2004/062703 | 7/2004 |
| WO | WO 2005/028744 | 3/2005 |
| WO | WO 2005/058972 | 6/2005 |
| WO | WO 2005/068074 | 7/2005 |
| WO | WO 2006/102543 | 9/2006 |
| WO | WO 2006/119392 | 11/2006 |
| WO | WO 2006/125517 | 11/2006 |
| WO | WO 2006/127880 | 11/2006 |
| WO | WO 2007/042192 | 4/2007 |
| WO | WO 2007/090461 | 8/2007 |
| WO | WO 2008/010187 | 1/2008 |
| WO | WO 2008/098037 | 8/2008 |
| WO | WO 2008/153565 | 12/2008 |
| WO | WO 2008/154073 | 12/2008 |
| WO | WO 2009/134746 | 11/2009 |
| WO | WO 2010/025224 | 3/2010 |
| WO | WO 2010/138941 | 12/2010 |
| WO | WO 2011/002956 | 1/2011 |
| WO | WO 2011/088889 | 7/2011 |
| WO | WO 2011/089123 | 7/2011 |
| WO | WO 2011/090425 | 7/2011 |
| WO | WO 2012/115115 | 8/2012 |
| WO | WO 2013/000074 A1 | 1/2013 |
| WO | WO 2013/150184 A1 | 10/2013 |

OTHER PUBLICATIONS

Ni et al., A Fundamental Study of Chlorine Dioxide Bleaching of Kraft Pulp,1992, McGill University.*
Rao et al., Acidified Sodium Chlorite, 2007, 68th JECFA.*
Achwal, W.B., et al.; Viscosity Measurements on Chemically Modified Celluloses; I&EC Product Research and Development; vol. 6, No. 4 (Dec. 1967); pp. 278-281.
Ahrgren, L., The Action of Fenton's Reagent on Dextran, Die Starke 27., Jahrg. 1975, No. 4, pp. 121-123.
Andrews, D.H., et al.; The Bleaching of Pulp; TAPPI Press; Third Ed. (1979); pp. 211-220.
Argyropoulos, D., et al., Nitrogen-Centered Activators of Peroxide-Reinforced Oxygen Delignification, Ind. Eng. Chem. Res., American Chemical Society, Feb. 4, 2004, pp. 1200-1205.
Birtwell, C., et al., The Chemical Analysis of Cotton-Oxycellulose, Part I, Journal of the Textile Institute Transactions (1925); 16:1; T13-T52.
Blattner, R., et al; Effects of Iron, Copper, and Chromate Ions on the Oxidative Degradation of Cellulose Model Compounds; Carbohydrate Research; vol. 138 (1985); pp. 73-82.
Bragd, P.L., et al., Tempo-mediated oxidation of polysaccharides: survey of methods and applications, Topics in Catalysis, vol. 27, Nos. 1-4, Feb. 2004, pp. 49-66.

English-language abstract of DE 10123665.
English-language abstract of FR 2688787.
English-language abstract of JP 2001115389.
English-language abstract of JP 2003-026701.
Burgess, "Relationships Between Colour Production in Cellulose and the Chemical Changes Brought About by Bleaching," Transcript of a Lecture given at the Meeting of the Book and Paper Specialty Group, AIC Annual Meeting, Milwaukee, May 27-30, 1982 (http://cool.conversation-us.org/coolaic/sg/bpg/annual/v01/bp01-05.html).
Calvini, P., et al.; Viscometric determination of a dialdehyde content in periodate oxycellulose. Part I. Methodology; Celulose, vol. 11 (2004) pp. 99-107.
Chandra, S., et al.; Kinetics of Carbohydrate and Lignin Degradation and Formation of Carbonyl and Carboxyl Groups in Low Consistency Ozonation of Softwood Pulps; International Pulp Bleaching Conference (1985); pp. 28-35.
Dang et al., "Alkaline peroxide treatment of ECF bleached softwood kraft pulps. Part 1. Characterizing the effect of alkaline peroxide treatment on carboxyl groups of fibers," Holzforschung,vol. 61, pp. 445-450, 2007.
Dang, "The Investigation of Carboxyl Groups of Pulp Fibers During Kraft Pulping, Alkaline Peroxide Bleaching, and TEMPO-mediated Oxication,"Georgia Insitute of Technology, Aug. 2007.
de Belder, A.N., et al., The Oxidation of Glycosides, ACTA Chemica SCandinavica 17 (1963), pp. 1012-1014.
Easty et al., "Estimation of Pulp Yield in Continuous Digesters from Carbohydrate and Lignin Determinations," TAPPI Journal 65(12):78-80 (1982).
Edwards et al., "Research and Development of Active Cotton Wound Dressings," 2004 Beltwide Cotton Conferences, San Antonio, TX.
Ellefsen, O., Viscosity Measurements on Chemically Modified Cellulose; Journal of Polymer Science: Part C; No. 2 (1963); pp. 321-330.
Emery, J., et al., Iron-Catalyzed Oxidation of Wood Carbohydrates, Wood Science and Technology, vol. 8 (1974), pp. 127-137.
ESM 055B "Aldehyde and Carboxyl Content of Pulp" Method Summary, cited in WO2010/138941, published Dec. 2, 2010.
Fellers, C., et al., Ageing/Degradation of Paper, Report No. 1E, FoU-projektet for papperskonservering, Stockholm, Sep. 1989, pp. 1-137.
Fibersource.com, "Cellulose," [retrieved Sep. 12, 2013 from http://www.fibersource.com/F-tutor/cellulose.htm], 5 pages.
Filho et al., "Hydrogen Peroxide in Chemical Pulp Bleaching—an overview," 2002 Congreso Iberoamericano de Invesigacion en cellulosa y Papel, CIADICYP, pp. 1-27.
Gierer, J., Formation and Involvement of Superoxide (O2-HO2) and Hydroxyl (OH) Radicals in TCF Bleaching Processes: A Review; Department of Pulp and Paper Chemistry and Technology; The Royal Institute of Technology; Stockholm; Holzforschung; vol. 51, No. 1 (1997); pp. 34-46.
Gilbert, B., et al., The Oxidation of Some Polysaccharides by the Hydroxyl Radical: An E.S.R. Investigation; Carbohydrate Research; vol. 125 (1984); pp. 217-235.
Godsay, M.P., et al.; Physico-Chemical Properties of Ozone Oxidized Kraft Pulps; TAPPI; 1984 Oxygen Delignification Symposium; pp. 55-69.
Grant, J., Wood Pulp, A New Series of Plant Science Books, vol. II, Chronica Botanica Company, 1938; pp. 158-169.
Gullichsen et al., Chemical Pulping 6A, 1999, Fapet Oy, pp. A206-A207 and A653.
Gullichsen, "Chemical Pulping," Papermaking Science and Technology, Book 6A, pp. A635-A665, 1992.
Halliwell, G., Catalytic Decomposition of Cellulose under Biological Conditions; Biochem. J. (1965), vol. 95, pp. 35-40.
International Paper, https://web.archive.org/web/200511 07013141/http://www.internationalpaper.com/Paper/Paper%20Products/Pulp/Southern_Bleached_So.html, Nov. 7, 2005.
International Search Report dated Oct. 20, 2014, in corresponding Application No. PCT/IB2014/001272.
International Search Report dated Jun. 5, 2015, in corresponding International Application No. PCT/US2015/019479.

(56) References Cited

OTHER PUBLICATIONS

Isogai, A., et al., Preparation of polyuronic acid from cellulose by TEMPO-mediated oxidation, Cellulose (1998), vol. 5., pp. 153-164.
Ivanov, V.I., et al., Chemical changes produces in the cellulose macromolecule by oxidizing agents, Bulletin of the Academy of Sciences of the USSR, Mar.-Apr. 1953, vol. 2, Issue 2, pp. 341-350.
Kennedy et al., The Chemistry and Processing of Wood and Plant Fibrous Materials, p. 155, Woodhead Publishing Ltd, Abington Hall, Abington, Cambridge CBI 6AH, England (1996).
Keshk, S., Homogenous reactions of cellulose from different natural sources, Carbohydrate Polymers, vol. 74 (2008), pp. 942-945.
Kirk, T.K., et al.; Characteristics of Cotton Cellulose Depolymerized by a Brown-Rot Fungus, by Acid, or by Chemical Oxidants; Holzforschung; vol. 45, No. 4 (1991) pp. 239-244.
Kishimoto, T., et al., No-Chlorine Bleaching of Kraft Pulp, Holzforschung, vol. 52 (1998), pp. 180-184.
Koenigs, J., Hydrogen Peroxide and Iron: A Proposed System for Decomposition of Wood by Brown-Rot Basidiomycetes, Journal of Society of Wood and Technology, vol. 6, No. 1, Spring 1974, pp. 66-80.
Kubelka et al., "Delignification with Acidic Hydrogen Peroxide Activated by Molybdate," Journal of Pulp and Paper Science: vol. 18, No. 3, May 1992, pp. J108-J114.
Lapierre et al., "The Effect of Magnesium Ions and Chelants on Peroxide Bleaching," Holzforschung, vol. 57, No. 6, pp. 627-633, 2003.
Launer, H.F., et al.; Failure of Alkaline Methods to Measure Degree of Polymerization of Carbohydrates; Analytical Chemistry; vol. 33; No. 1; Jan. 1961; pp. 79-83.
Lenntech BV, http:/www.lentech.com/Fenton-reaction.htm [downloaded from www.archive.org], Jun. 28, 2003 [retrieved Sep. 12, 2013], whole document.
Moody, G.J., The Action of Hydrogen Peroxide on Carbohydrates and Related Compounds, Advances in Carbohydrate Chemistry, Academic Press, vol. 19 (1964), pp. 149-179.
Morton, J.H., The Chemistry and Processing of Wood and Plant Fibrous Materials; Woodhead Publishing Ltd. (1996); pp. 151-158.
Mussatto, S., et al., Hydrogen peroxide bleaching of cellulose pulps obtained from brewer's spent grain, Cellulose (2008), vol. 15, pp. 641-649.
Nevell, T.P.; Effect of Manganese (II), Cobalt (II), and Copper (I) Hydroxides on the Kinetics of the Oxidation of Cellulose by Hypochlorite; Textile Research Journal (1985); pp. 270-280.
Perng, Y., et al., The effect of metal complexes in the electrochemically mediated oxygen bleaching of wood pulp, TAPPI Journal (1993) vol. 76, No. 10, pp. 139-147.
Qian et al., Journal of Wood Chemistry and Technology (2002), vol. 22, No. 4, pp. 267-284.
Qian, "The Chemical Mechanism of a Brown-Rot Decay Mimtic System and its Applicationi n paper Recycling Processes," [Chapter 4: The Effects of Chelator Mediated Fenton System on the Fiber and Paper Properties of Hardwood Kraft Pulp], 2001, *Electronic Theses and Dissertations*, Paper 505.
Ragauskas, Copper Number—Carbonyl Content of Pulp Fibers (2007).
Rahmawati et al., "Pulp bleaching by hydrogen peroxide activated with copper 2,2_-dipyridylamine and 4-aminopyridine complexes," 2005, Chemical Engineering Journal, vol. 112, pp. 167-171.
Rapson, W.H., et al., Carbonyl Groups in Cellulose and Colour Reversion, Pulp and Paper Magazine of Canada; Jul. 1957; pp. 151-157.
Rapson, W.H., The Role of pH in Bleaching Pulp; TAPPI; vol. 39, No. 5; May 1956; pp. 284-294.
Rohrling et al., "A novel method for the determination of carbonyl groups in cellulosics by fluorescence labeling. 2. Validation and applications," Biomacromolecules 2002, Sep.-Oct.; 3(5): 969-975.
Ruuttunen et al., "Concomitant Usage of Transition Metal Polyanions as Catalysts in Oxygen Delignification: Laboratory Bleaching Trials," 2006, Appita Journal, pp. 1-14.
Saito, T., et al., Cellulose Nanofibers Prepared by TEMPO-Mediated Oxidation of Native Cellulose, Biomacromolecules (2007), vol. 8, pp. 2485-2491.
Shenai, "Studies in Chemically Modified Celluloses. IX. Oxidation of Cellulose in the Presence of Chelating Agents," 1976, Journal of Applied Polymer Science, vol. 20, pp. 385-391.
Yang Shuhui et al., "Lignocellulosic Chemistry", p. 198-200, China Light Industry Press, Jan. 2001.
Sihtola H., et al.; Comparison and Conversion of Viscosity and DP-Values Determined by Different Methods; Paper and Timber; vol. 45, No. 1 (1963); pp. 225-232.
Smook, Handbook for Pulp and Paper Technologists, 1992, Angus Wilde Publications, 2nd edition, Chapter 16, pp. 228-263.
Smook, Handbook for Pulp Paper Technologist, 1992, Angus Wilde Publications, 2nd Edition, Chapter 13, pp. 194-208.
Smook, Handbook of Pulp & Paper Terminology, 1990, pp. 79-95.
Song et al., Novel antiviral activity of dialdehyde starch, Electronic J. Biotech., vol. 12, No. 2, 2009.
Suchy et al., "Catalysis and Activation of Oxygen and Peroxide Delignification of Chemical Pulps; A Review," Miscellaneous Report, Pulp and Paper Research Institute of Canada, 1999, pp. 1-32.
Sun et al., "The effect of metal ions on the reaction of hydrogen peroxide with Kraft lignin model compounds" 1999, Can. J. Chem, vol. 77 (pp. 667-675).
TAPPI T237 cm-98; Carboxyl Content of Pulp (1998).
TAPPI T230 om-99; Viscosity of pulp (capillary viscometer method) (1999).
TAPPI T430 cm-99; Copper Number of Pulp, Paper, and Paperboard (1999).
Tanaka, N., et al.; Effect of Oxalic Acid on the Oxidative Breakdwon of Cellulose by the Fenton Raction; Kyoto University (1994); pp. 8-10.
Walker, C., Selectivity of Iron-Based Catalysts in a Polymeric Model System for Biomimetic Bleaching; The Institute of Paper Science and Technology; Sep. 1994; 196 pages.
Whitmore, P.M., et al.; Determination of the Cellulose Scission Route in the Hydrolytic and Oxidative Degradation of Paper; Restaurator; vol. 15 (1994); pp. 26-45.
Wojciak et al., "Direct Characterization of Hydrogen Peroxide Bleached Thermomechanial Pulp Using Spectroscopic Methods," J. Phys. Chem. A., vol. 111, pp. 10530-10536, 2007.
Zeronian et al., "Bleaching of cellulose by hydrogen peroxide," Cellulose, 1995, pp. 265-272.
Office Action dated May 16, 2016 in co-pending U.S. Appl. No. 14/206,744.
Office Action dated Nov. 20, 2015 in co-pending U.S. Appl. No. 14/206,744.
Office Action dated Jun. 2, 2017 in co-pending U.S. Appl. No. 14/206,744.

* cited by examiner

LOW VISCOSITY KRAFT FIBER HAVING AN ENHANCED CARBOXYL CONTENT AND METHODS OF MAKING AND USING THE SAME

This application is a national stage entry under 35 U.S.C. § 371 of PCT International Application No. PCT/US2015/019479, filed Mar. 9, 2015, which claims the benefit of priority as a continuation-in-part of PCT International Application No. PCT/IB32014/001272, filed Mar. 12, 2014, the contents of each of which are incorporated herein by reference.

This disclosure relates to oxidized acid-treated kraft fiber having an enhanced carboxyl content resulting in, among other things, better water absorptive capacity, improved wet and dry strength, improved anti-yellowing characteristics and a lower pH. More particularly, this disclosure relates to a kraft fiber, e.g., softwood fiber, that has been oxidized to result in a unique set of characteristics, improving its performance over untreated and other treated fiber.

This disclosure further relates to chemically modified cellulose fiber derived from bleached softwood that has an enhanced carboxyl content, making it suitable for use as fluff pulp in absorbent products, and in other consumer product applications, and in some instances as a chemical cellulose feedstock in the production of cellulose derivatives including cellulose ethers, esters, and viscose.

This disclosure also relates to methods for producing the improved fiber described. The fiber is generally subjected to digestion and oxygen delignification, followed by bleaching. The fiber is generally subjected to at least one catalytic oxidation treatment and at least one carboxylating acid treatment. In some embodiments, the fiber is oxidized with a combination of hydrogen peroxide and iron or copper and then further bleached to provide a fiber with appropriate brightness characteristics, for example brightness comparable to standard bleached fiber. In one embodiment, the fiber can be oxidized in a kraft process, such as a kraft bleaching process and then subjected to a carboxylating acid treatment. Still a further embodiment relates to processes including five bleaching stages comprising a sequence of $D_0E_1D_1E_2D_2$, where one or more of the $E_1$ or $E_2$ stages comprises the catalytic oxidation treatment. The fiber may be subjected to the carboxylating acid treatment either after bleaching or in one or more of the $D_0$, $D_1$ and $D_2$ stages.

Finally, this disclosure relates to products produced using the improved oxidized acid-treated kraft fiber as described.

Cellulose fiber and derivatives are widely used in paper, absorbent products, food or food-related applications, pharmaceuticals, and in industrial applications. The main sources of cellulose fiber are wood pulp and cotton. The cellulose source and the cellulose processing conditions generally dictate the cellulose fiber characteristics, and therefore, the fiber's applicability for certain end uses. A need exists for cellulose fiber that is relatively inexpensive to process, yet is highly versatile, enabling its use in a variety of applications.

Kraft fiber, produced by a chemical kraft pulping method, provides an inexpensive source of cellulose fiber that generally provides final products with good brightness and strength characteristics. As such, it is widely used in paper applications. However, standard kraft fiber's end uses may be limited due to the chemical structure of the cellulose resulting from standard kraft pulping and bleaching. In general, standard kraft fiber contains too much residual hemi-cellulose and other naturally occurring materials that may interfere with the subsequent physical and/or chemical modification of the fiber. Moreover, standard kraft fiber has limited chemical functionality, and is generally rigid and not highly compressible.

In the standard kraft process a chemical reagent referred to as "white liquor" is combined with wood chips in a digester to carry out delignification. Delignification refers to the process whereby lignin bound to the cellulose fiber is removed due to its high solubility in hot alkaline solution. This process is often referred to as "cooking." Typically, the white liquor is an alkaline aqueous solution of sodium hydroxide (NaOH) and sodium sulfide ($Na_2S$). Depending upon the wood species used and the desired end product, white liquor is added to the wood chips in sufficient quantity to provide a desired total alkali charge based on the dried weight of the wood.

Generally, the temperature of the wood/liquor mixture in the digester is maintained at about 145° C. to 170° C. for a total reaction time of about 1-3 hours. When digestion is complete, the resulting kraft wood pulp is separated from the spent liquor (black liquor) which includes the used chemicals and dissolved lignin. Conventionally, the black liquor is burnt in a kraft recovery process to recover the sodium and sulphur chemicals for reuse.

At this stage, the kraft pulp exhibits a characteristic brownish color due to lignin residues that remain on the cellulose fiber. Following digestion and washing, the fiber is often bleached to remove additional lignin and whiten and brighten the fiber. Because bleaching chemicals are much more expensive than cooking chemicals, typically, as much lignin as possible is removed during the cooking process. However, it is understood that these processes need to be balanced because removing too much lignin can increase cellulose degradation. The typical Kappa number (the measure used to determine the amount of residual lignin in pulp) of softwood after cooking and prior to bleaching is in the range of 28 to 32.

Commonly, fiber production includes an oxygen delignification process between digestion and the start of bleaching. This delignification process generally reduces the lignin content and improves the effectiveness of the bleaching sequence.

Following digestion and washing, the fiber is generally bleached in multi-stage sequences, which traditionally comprise strongly acidic and strongly alkaline bleaching steps, including at least one alkaline step at or near the end of the bleaching sequence. Bleaching of wood pulp is generally conducted with the aim of selectively increasing the whiteness or brightness of the pulp, typically by removing lignin and other impurities, without negatively affecting physical properties. Bleaching of chemical pulps, such as kraft pulps, generally requires several different bleaching stages to achieve a desired brightness with good selectivity. Typically, a bleaching sequence employs stages conducted at alternating pH ranges. This alternation aids in the removal of impurities generated in the bleaching sequence, for example, by solubilizing the products of lignin breakdown. Thus, in general, it is expected that using a series of acidic stages in a bleaching sequence, such as three or five acidic stages in sequence, would not provide the same brightness as alternating acidic/alkaline stages, such as acidic-alkaline-acidic or acidic-alkaline-acidic-alkaline-acidic. For instance, a typical DEDED sequence would be expected to produce a brighter product than a DEDAD sequence (where A refers to an acid treatment).

Cellulose exists generally as a polymer chain comprising hundreds to tens of thousands of glucose units. Cellulose may be oxidized to modify its functionality. Various methods of oxidizing cellulose are known. In cellulose oxidation, hydroxyl groups of the glycosides of the cellulose chains can be converted, for example, to carbonyl groups such as aldehyde groups or carboxylic acid groups. Depending on the oxidation method and conditions used, the type, degree, and location of the carbonyl modifications may vary. It is known that certain oxidation conditions may degrade the cellulose chains themselves, for example by cleaving the glycosidic rings in the cellulose chain, resulting in depolymerization. In most instances, depolymerized cellulose not only has a reduced viscosity, but also has a shorter fiber length than the starting cellulosic material. When cellulose is degraded, such as by depolymerizing and/or significantly reducing the fiber length and/or the fiber strength, it may be difficult to process and/or may be unsuitable for many downstream applications. A need remains for methods of modifying cellulose fiber that may improve fiber functionalities, which methods do not extensively degrade the cellulose fiber.

Various attempts have been made to oxidize cellulose to provide both carboxylic and aldehydic functionality to the cellulose chain without degrading the cellulose fiber. In many cellulose oxidation methods, it has been difficult to control or limit the degradation of the cellulose when aldehyde groups are present on the cellulose. Oxidized cellulose with high aldehyde or carbonyl contents are known to suffer chain degradation if treated with alkali. Previous attempts at resolving these issues have included the use of multi-step oxidation processes, for instance site-specifically modifying certain carbonyl groups in one step and oxidizing other hydroxyl groups in another step, and/or providing mediating agents and/or protecting agents, all of which may impart extra cost and by-products to a cellulose oxidation process.

In addition to the difficulties in controlling the chemical structure of cellulose oxidation products, and the degradation of those products, it is known that the method of oxidation may affect other properties, including chemical and physical properties and/or impurities in the final products. For instance, the method of oxidation may affect the degree of crystallinity, the hemi-cellulose content, the color, and/or the levels of impurities in the final product and the yellowing characteristics of the fiber. Ultimately, the method of oxidation may impact the ability to process the cellulose product for industrial or other applications. Pulping and bleaching processes that may be used in the instant invention includes those disclosed in published International Applications Nos. WO/2010/138941, WO/2012/170183, WO/2013/106703, and WO/2014/140940. These processes can effectively oxidize the fiber without unduly degrading the fiber.

For certain end uses, where increased functionality is desired, the fiber of the invention is oxidized and then treated to further modify the fibers functional characteristics. Oxidized cellulose fibers may be treated with a carboxylating acid that converts aldehyde functional groups to carboxyl functional groups. Conversion of aldehyde functional groups to carboxyl functional groups beneficially reduces the oxidized cellulose's sensitivity to degradation from subsequent alkaline treatment. Carboxylating acids include chlorous acid, acidic potassium dichromate, and potassium permanganate. Methods of chlorous acid treatment are known. Typically, sodium chlorite or chlorine dioxide is used to form chlorous acid. As chlorous acid is generated, it is quickly converted to hypochlorous acid. Typically, hydrogen peroxide is also added with sodium chlorite or chlorine dioxide to convert hypochlorous acid back to chlorous acid.

The methods of the present disclosure result in products that have characteristics that are not seen in prior art fibers. Thus, the methods of the disclosure can be used to produce products that are superior to products of the prior art. In addition, the fiber of the present invention can be cost-effectively produced.

DESCRIPTION

I. Methods

The present disclosure provides novel methods for producing cellulose fiber. The method comprises subjecting cellulose to a kraft pulping step, an oxygen delignification step, a bleaching sequence and carboxylating acid treatment. Similar pulping and bleaching processes are disclosed in published International Applications Nos. WO/2010/138941, WO/2012/170183, WO/2013/106703, and WO/2014/140940, which are incorporated by reference in their entirety. Fiber produced under the conditions as described in the instant application exhibits the same high whiteness and high brightness, while having an enhanced carboxyl content over the fiber described in published International Application Serial Nos. WO/2010/138941, WO/2012/170183, and WO/2013/106703.

The present disclosure provides novel methods for producing cellulose fiber. The method comprises subjecting cellulose to a kraft pulping step, an oxygen delignification step, a multi-stage bleaching sequence which includes at least one catalytic oxidation stage and at least one carboxylating acid treatment stage. In one embodiment, the conditions under which the cellulose is processed result in softwood fiber exhibiting high brightness and low viscosity while reducing the tendency of the fiber to yellow upon exposure to heat, light and/or chemical treatment.

The cellulose fiber used in the methods described herein may be derived from softwood fiber, hardwood fiber, and mixtures thereof. In some embodiments, the cellulose fiber is derived from softwood, such as southern pine. In some embodiments, the cellulose fiber is derived from hardwood, such as *eucalyptus*. In some embodiments, the cellulose fiber is derived from a mixture of softwood and hardwood. In yet another embodiment, the cellulose fiber is derived from cellulose fiber that has previously been subjected to all or part of a kraft process, i.e., recycled fiber.

References in this disclosure to "cellulose fiber," "kraft fiber," "pulp fiber" or "pulp" are interchangeable except where specifically indicated to be different or where one of ordinary skill in the art would understand them to be different. As used herein "modified acid-treated kraft fiber," i.e., fiber which has been cooked, bleached, oxidized and treated with a carboxylating acid in accordance with the present disclosure may be used interchangeably with "oxidized acid treated fiber," "kraft fiber" or "pulp fiber" to the extent that the context warrants it.

The present disclosure provides novel methods for treating cellulose fiber. In some embodiments, the disclosure provides a method of modifying cellulose fiber, comprising providing cellulose fiber, and oxidizing the cellulose fiber, resulting in modified cellulose fiber. As used herein, "modified," "oxidized," "catalytically oxidized," "catalytic oxidation" and "oxidation" are all understood to be interchangeable and refer to treatment of cellulose fiber with at least one metal catalyst, such as iron or copper and at least one peroxide, such as hydrogen peroxide, such that at least some of the hydroxyl groups of the cellulose fibers are oxidized. The phrase "iron or copper" and similarly "iron (or copper)"

mean "iron or copper or a combination thereof." In some embodiments, the oxidation comprises simultaneously increasing carboxylic acid and aldehyde content of the cellulose fiber. Ketone content may also be increased.

As used herein, "degree of polymerization" may be abbreviated "DP." "Ultra low degree of polymerization" may be abbreviated "ULDP."

In some embodiments, the disclosure provides a method of treating oxidized cellulose fiber with a carboxylating acid, comprising providing oxidized fiber, and acid treating the oxidized cellulose fiber. As used herein, "acid-treated" refers to treatment of oxidized cellulose fiber with at least one acid, such as chlorous acid, so that at least some of the aldehyde groups of the oxidized cellulose fibers are converted to carboxyl groups. In some embodiments, the cellulose fiber may be acid treated with a carboxylating acid prior to oxidation. In some embodiments, the cellulose fiber may be acid treated with a carboxylating acid both prior to and after oxidation.

In some embodiments, the method of making a modified acid-treated kraft fiber comprises subjecting cellulose fiber to a kraft pulping step; oxygen delignifying the cellulose fiber; bleaching the cellulose fiber using a multi-stage bleaching process; oxidizing the cellulose fiber with a peroxide and a catalyst under acidic conditions in at least one stage of the multi-stage bleaching process; treating the fiber with a carboxylating acid in at least one stage of the multi-stage bleaching process prior to the at least one oxidation stage; and treating the fiber with a carboxylating acid in at least one stage of the multi-stage bleaching process following the at least one oxidation stage.

In one embodiment, cellulose is digested using a method that is known in the art. A typical method of digestion includes the removal of lignin from cellulose fiber in hot alkaline solution. This process is often referred to as "cooking." Typically, the white liquor is an alkaline aqueous solution of sodium hydroxide (NaOH) and sodium sulfide ($Na_2S$). Generally, the temperature of the wood/liquor mixture in the digester is maintained at about 145° C. to 170° C. for a total reaction time of about 1-3 hours. When digestion is complete, the resulting kraft wood pulp is separated from the spent liquor (black liquor) which includes the used chemicals and dissolved lignin.

Digestion may be carried out with or without oxygen delignification. The typical Kappa number (the measure used to determine the amount of residual lignin in pulp) of the pulp after cooking, and optionally oxygen delignification, and prior to bleaching is in the range of 28 to 32.

According to another embodiment, preferably southern pine, can be digested in a two-vessel hydraulic digester with, Lo-Solids® cooking to a kappa number ranging from about 10 to about 21. The resulting pulp is subjected to oxygen delignification until it reaches a kappa number of about 8 or below, for example, 6.5 or below. The cellulose pulp is then bleached in a multi-stage bleaching sequence which includes at least one catalytic oxidation stage and at least one acid treatment stage.

In one embodiment, the method comprises digesting the cellulose fiber in a continuous digester with a co-current, down-flow arrangement. The effective alkali ("EA") of the white liquor charge is at least about 15% on pulp, for example, at least about 15.5% on pulp, for example at least about 16% on pulp, for example, at least about 16.4% on pulp, for example at least about 17% on pulp, for example at least about 18% on pulp, for example, at least about 18.5% on pulp. As used herein a "% on pulp" refers to an amount based on the dry weight of the kraft pulp. In one embodiment, the white liquor charge is divided with a portion of the white liquor being applied to the cellulose in the impregnator and the remainder of the white liquor being applied to the pulp in the digester. According to one embodiment, the white liquor is applied in a 50:50 ratio. In another embodiment, the white liquor is applied in a range of from 90:10 to 30:70, for example in a range from 50:50 to 70:30, for example 60:40. According to one embodiment, the white liquor is added to the digester in a series of stages. According to one embodiment, digestion is carried out at a temperature between about 160° C. to about 168° C., for example, from about 163° C. to about 168° C., for example, from about 166° C. to about 168° C., and the cellulose is treated until a target kappa number between about 13 and about 21 is reached. It is believed that the higher than normal effective alkali ("EA") and higher temperatures than used in the prior art achieve the lower than normal Kappa number.

According to one embodiment of the invention, the digester is run with an increase in push flow which increases the liquid to wood ratio as the cellulose enters the digester. This addition of white liquor is believed to assist in maintaining the digester at a hydraulic equilibrium and assists in achieving a continuous down-flow condition in the digester.

In one embodiment, the method comprises oxygen delignifying the cellulose fiber after it has been cooked to a kappa number from about 13 to about 21 to further reduce the lignin content and further reduce the kappa number, prior to bleaching. Oxygen delignification can be performed by any method known to those of ordinary skill in the art. For instance, oxygen delignification may be carried out in a conventional two-stage oxygen delignification process. In one embodiment, if traditional digestion is used, the target kappa number may be 10 to 18. In another embodiment, if digestion is carried out to a kappa number of 21 or below, the delignification may be carried out to a target kappa number of about 8 or lower, for example about 6.5 or lower, for example about 5 to about 8.

In one embodiment, during oxygen delignification, the applied oxygen is less than about 3% on pulp, for example, less than about 2.4% on pulp, for example, less than about 2% on pulp, for example less than about 1.8% on pulp, for example less than about 1.6% on pulp. According to one embodiment, fresh caustic is added to the cellulose during oxygen delignification. Fresh caustic may be added in an amount of from about 2% on pulp to about 3.8% on pulp, for example, from about 3% on pulp to about 3.2% on pulp. According to one embodiment, the ratio of oxygen to caustic is reduced over standard kraft production; however, the absolute amount of oxygen remains the same. Delignification may be carried out at a temperature of from about 85° C. to about 104° C., for example, from about 90° C. to about 102° C., for example, from about 96° C. to about 102° C., for example about 90° C. to about 96° C.

After the fiber has reached the desired Kappa Number, the fiber is subjected to a multi-stage bleaching sequence. The stages of the multi-stage bleaching sequence may include any conventional or after discovered series of stages and may be conducted under conventional conditions.

In some embodiments, prior to bleaching, the pH of the cellulose is adjusted to a pH ranging from about 2 to about 6, for example from about 2 to about 5, or from about 2 to about 4, or from about 2 to about 3.

The pH can be adjusted using any suitable acid, as a person of skill would recognize, for example, sulfuric acid or hydrochloric acid or filtrate from an acidic bleach stage of a bleaching process, such as a chlorine dioxide (D) stage of a multi-stage bleaching process. For example, the cellulose fiber may be acidified by adding an extraneous acid. Examples of extraneous acids are known in the art and include, but are not limited to, sulfuric acid, hydrochloric acid, and carbonic acid. In some embodiments, the cellulose fiber is acidified with acidic filtrate, such as waste filtrate, from a bleaching step. In at least one embodiment, the cellulose fiber is acidified with acidic filtrate from a D stage of a multi-stage bleaching process.

The fiber, described, is first subjected to a catalytic oxidation treatment. In some embodiments, the fiber is oxidized with iron and/or copper and a peroxide.

Oxidation of cellulose fiber involves treating the cellulose fiber with at least a catalytic amount of a metal catalyst, such as iron or copper and a peroxygen, such as hydrogen peroxide. In at least one embodiment, the method comprises oxidizing cellulose fiber with iron and hydrogen peroxide. The source of iron can be any suitable source, as a person of skill would recognize, such as for example ferrous sulfate (for example ferrous sulfate heptahydrate), ferrous chloride, ferrous ammonium sulfate, ferric chloride, ferric ammonium sulfate, or ferric ammonium citrate.

In some embodiments, the method comprises oxidizing the cellulose fiber with copper and hydrogen peroxide. Similarly, the source of copper can be any suitable source as a person of skill would recognize. Finally, in some embodiments, the method comprises oxidizing the cellulose fiber with a combination of copper and iron and hydrogen peroxide.

When cellulose fiber is oxidized according to the present invention, it is done in an acidic environment. The fiber should not be subjected to substantially alkaline conditions during the oxidation. In some embodiments, the method comprises oxidizing cellulose fiber at an acidic pH. In some embodiments, the method comprises providing cellulose fiber, acidifying the cellulose fiber, and then oxidizing the cellulose fiber at acidic pH. In some embodiments, the pH ranges from about 2 to about 6, for example from about 2 to about 5, or from about 2 to about 4.

In some embodiments, the method comprises oxidizing the cellulose fiber in one or more stages of a multi-stage bleaching sequence. In some embodiments, the cellulose fiber may be oxidized in either the second stage or the fourth stage of a multi-stage bleaching sequence, for example, a five-stage bleaching sequence. In other embodiments, the oxidation may be carried out in two or more stages of a multi-stage bleaching sequence. In some embodiments, the cellulose fiber may be further oxidized in one or more additional stages preceding or following the bleaching sequence.

In accordance with the disclosure, the multi-stage bleaching sequence can be any bleaching sequence. In at least one embodiment, the multi-stage bleaching sequence is a five-stage bleaching sequence. In some embodiments, the bleaching sequence is a DEDED sequence. In some embodiments, the bleaching sequence is a $D_0E_1D_1E_2D_2$ sequence. In some embodiments, the bleaching sequence is a $D_0(EoP)D_1E_2D_2$ sequence. In some embodiments the bleaching sequence is a $D_0(EO)D_1E_2D_2$.

The non-oxidation stages of a multi-stage bleaching sequence may include any conventional or after discovered series of stages and may be conducted under conventional conditions.

In some embodiments, the oxidation is incorporated into the second stage of a multi-stage bleaching process. In some embodiments, the method is implemented in a five-stage bleaching process having a sequence of $D_0E_1D_1E_2D_2$, and the second stage ($E_1$) is used for oxidizing kraft fiber.

In some embodiments, the oxidation is incorporated into the fourth stage of a multi-stage bleaching process. In some embodiments, the method is implemented in a five-stage bleaching process having a sequence of $D_0E_1D_1E_2D_2$, and the fourth stage ($E_2$) is used for oxidizing kraft fiber.

In some embodiments, the oxidation is incorporated into two or more stages of a multi-stage bleaching process. In some embodiments, the method is implemented in a five-stage bleaching process having a sequence of $D_0E_1D_1E_2D_2$, and the second ($E_1$) and fourth stages ($E_2$) are used for oxidizing kraft fiber.

In some embodiments, the kappa number increases after oxidation of the cellulose fiber. More specifically, one would typically expect a decrease in kappa number across an oxidation bleaching stage based upon the anticipated decrease in material, such as lignin, which reacts with the permanganate reagent. However, in the method as described herein, the kappa number of cellulose fiber may decrease because of the loss of impurities, e.g., lignin; however, the kappa number may increase because of the chemical modification of the fiber. Not wishing to be bound by theory, it is believed that the increased functionality of the oxidized cellulose provides additional sites that can react with the permanganate reagent. Accordingly, the kappa number of oxidized kraft fiber is elevated relative to the kappa number of standard kraft fiber.

An appropriate retention time in one or more oxidation stages is an amount of time that is sufficient to catalyze the hydrogen peroxide with the iron or copper catalyst. Such time will be easily ascertainable by a person of ordinary skill in the art.

In accordance with the disclosure, the oxidation is carried out for a time and at a temperature that is sufficient to produce the desired completion of the reaction. For example, the oxidation may be carried out at a temperature ranging from about 60 to about 90° C., and for a time ranging from about 40 to about 80 minutes. The desired time and temperature of the oxidation reaction will be readily ascertainable by a person of skill in the art.

The fiber of the present disclosure may be subjected to any traditional bleaching sequence using art recognized conditions. The bleaching conditions provided herein are merely exemplary.

According to one embodiment, the cellulose is subjected to a D(EoP)DE$_2$D bleaching sequence. According to this embodiment, the first D stage (D$_0$) of the bleaching sequence is carried out at a temperature of at least about 55° C., for example at least about 60° C., for example, at least about 66° C., for example, at least about 71° C., for example from about 55° C. to about 80° C., and at a pH of less than about 3, for example about 2.5. Chlorine dioxide is applied in an amount of greater than about 0.5% on pulp, for example, greater than about 0.8% on pulp, for example about 0.9% on pulp, for example from about 0.5 to about 2.0%. Acid is applied to the cellulose in an amount sufficient to maintain the pH, for example, in an amount of at least about 1% on pulp, for example, at least about 1.15% on pulp, for example, at least about 1.25% on pulp.

According to one embodiment, the first E stage (E$_1$) is carried out at a temperature of at least about 74° C., for example at least about 77° C., for example at least about 79° C., for example at least about 82° C., and at a pH of greater than about 11, for example, greater than 11.2, for example about 11.4. Caustic is applied in an amount of greater than about 0.7% on pulp, for example, greater than about 0.8% on pulp, for example about 1.0% on pulp. Oxygen is applied to the cellulose in an amount of at least about 0.48% on pulp, for example, at least about 0.5% on pulp, for example, at least about 0.53% on pulp. Hydrogen Peroxide is applied to the cellulose in an amount of at least about 0.35% on pulp, for example at least about 0.37% on pulp, for example, at least about 0.38% on pulp, for example, at least about 0.4% on pulp, for example, at least about 0.45% on pulp. The skilled artisan would recognize that any known peroxygen compound could be used to replace some or all of the hydrogen peroxide.

According to another embodiment, if oxidation is carried out in the $E_1$ stage ($E_1$), it may be carried out at a temperature of at least about 75° C., for example at least about 80° C., for example, at least about 82° C. and at a pH of less than about 3.5, for example, less than 3.0, for example, less than about 2.8. An iron catalyst is added in, for example, aqueous solution at a rate of from about 25 to about 200 ppm $Fe^{+2}$, for example, from 50 to 150 ppm, for example, from 25 to 150 ppm, iron on pulp. Hydrogen can be applied to the cellulose at a low level, i.e., in an amount of less than about 0.5% on pulp, for example, less than about 0.3% on pulp, for example, about 0.25% on pulp. Alternatively, the hydrogen peroxide may be applied at a high level, i.e., 1% or more on pulp, for example, 1.25% on pulp, for example, 1.5% or more on pulp, for example, 2.0% or more on pulp. The skilled artisan would recognize that any known peroxygen compound could be used to replace some or all of the hydrogen peroxide.

According to one embodiment, the second D stage ($D_1$) of the bleaching sequence is carried out at a temperature of at least about 74° C., for example at least about 77° C., for example, at least about 79° C., for example at least about 82° C. and at a pH of less than about 4, for example less than 3.5, for example less than 3.2. Chlorine dioxide is applied in an amount of less than about 1.5% on pulp, for example, less than about 1.0%, for example, less than about 0.8% on pulp, for example about 0.7% on pulp. Caustic is applied to the cellulose in an amount effective to adjust to the desired pH, for example, in an amount of less than about 0.015% on pulp, for example, less than about 0.01% pulp, for example, about 0.0075% on pulp. The TAPPI viscosity of the pulp after this bleaching stage may be 9-12 mPa·s, for example or may be lower, for example 6.5 mPa·s or less.

According to one embodiment, the second E stage ($E_2$) is carried out at a temperature of at least about 74° C., for example at least about 77° C., for example at least about 79° C., for example at least about 82° C., and at a pH of greater than about 11, for example, greater than 11.2, for example about 11.4. Caustic is applied in an amount of greater than about 0.7% on pulp, for example, greater than about 0.8% on pulp, for example greater than about 1.0% on pulp, for example, greater than 1.2% on pulp. Hydrogen Peroxide is applied to the cellulose in an amount of at least about 0.25% on pulp, for example at least about 0.28% on pulp, for example, about 3.0% on pulp. The skilled artisan would recognize that any known peroxygen compound could be used to replace some or all of the hydrogen peroxide.

According to one embodiment, if the second E stage ($E_2$) is an oxidation stage, it is carried out at a temperature of at least about 74° C., for example at least about 79° C. and at a pH of greater than about 2.5, for example, greater than 2.9, for example about 3.3. An iron catalyst is added in, for example, aqueous solution at a rate of from about 25 to about 200 ppm $Fe^{+2}$, for example, from 50 to 150 ppm, for example, from 50 to 100 ppm, iron on pulp. Hydrogen Peroxide can be applied to the cellulose at a low level, i.e., in an amount of less than about 0.5% on pulp, for example, less than about 0.3% on pulp, for example, about 0.25% on pulp. Alternatively, the hydrogen peroxide may be applied at a high level, i.e., 1% or more on pulp, for example, 1.5% or more on pulp, for example, 2.0% or more on pulp. The skilled artisan would recognize that any known peroxygen compound could be used to replace some or all of the hydrogen peroxide.

In accordance with the disclosure, hydrogen peroxide is added to the cellulose fiber in acidic media in an amount sufficient to achieve the desired oxidation and/or degree of polymerization and/or viscosity of the final cellulose product. For example, peroxide can be added as a solution at a concentration from about 1% to about 50% by weight in an amount of from about 0.1 to about 0.5%, or from about 0.1% to about 0.3%, or from about 0.1% to about 0.2%, or from about 0.2% to about 0.3%, based on the dry weight of the pulp.

Iron or copper are added at least in an amount sufficient to catalyze the oxidation of the cellulose with peroxide. For example, iron can be added in an amount ranging from about 25 to about 200 ppm based on the dry weight of the kraft pulp, for example, from 50 to 200 ppm, for example, from 50 to 150 ppm. A person of skill in the art will be able to readily optimize the amount of iron or copper to achieve the desired level or amount of oxidation and/or degree of polymerization and/or viscosity of the final cellulose product.

In some embodiments, the method further involves adding heat, such as through steam, either before or after the addition of hydrogen peroxide.

In some embodiments, the final DP and/or viscosity of the pulp can be controlled by the amount of iron or copper and hydrogen peroxide and the robustness of the bleaching conditions prior to the oxidation step. A person of skill in the art will recognize that other properties of the oxidized kraft fiber of the disclosure may be affected by the amounts of catalyst and peroxide and the robustness of the bleaching conditions prior to the oxidation step. For example, a person of skill in the art may adjust the amounts of iron or copper and hydrogen peroxide and the robustness of the bleaching conditions prior to the oxidation step to target or achieve a desired brightness in the final product and/or a desired degree of polymerization or viscosity.

In some embodiments, a kraft pulp is acidified on a $D_1$ stage washer, the iron source (or copper source) is also added to the kraft pulp on the $D_1$ stage washer, the peroxide is added following the iron source (or copper source) at an addition point in the mixer or pump before the $E_2$ stage tower, the kraft pulp is reacted in the $E_2$ tower and washed on the $E_2$ washer, and steam may optionally be added before the $E_2$ tower in a steam mixer.

In some embodiments, iron (or copper) can be added up until the end of the $D_1$ stage, or the iron (or copper) can also be added at the beginning of the $E_2$ stage, provided that the pulp is acidified first (i.e., prior to addition of the iron (or copper)) at the $D_1$ stage. Steam may be optionally added either before or after the addition of the peroxide.

For example, in some embodiments, the treatment with hydrogen peroxide in an acidic media with iron (or copper) may involve adjusting the pH of the kraft pulp to a pH ranging from about 2 to about 5, adding a source of iron (or copper) to the acidified pulp, and adding hydrogen peroxide to the kraft pulp.

According to one embodiment, the third D stage ($D_2$) of the bleaching sequence is carried out at a temperature of at least about 74° C., for example at least about 77° C., for example, at least about 79° C., for example at least about 82° C. and at a pH of less than about 4, for example less than about 3.8. Chlorine dioxide is applied in an amount of less than about 0.5% on pulp, for example, less than about 0.3% on pulp, for example about 0.15% on pulp.

In some embodiments, the method comprises oxidizing the cellulose fiber in two or more stages of a multi-stage bleaching sequence. In other embodiments, the oxidation may be carried out in two stages chosen from one or more oxidation stages before the first bleaching stage, one or more oxidation stages within the bleaching sequence, and oxidation in a stage following the bleaching stage. In some embodiments, the cellulose fiber may be oxidized in both the second stage and the fourth stage of a multi-stage bleaching sequence, for example, a five-stage bleaching sequence. In some embodiments, the cellulose fiber may be further oxidized in one or more additional stages before or following the bleaching sequence. The non-oxidation stages of a multi-stage bleaching sequence may include any conventional or after discovered series of stages and may be conducted under conventional conditions. In some embodiments, the oxidation is incorporated into the second and fourth stages of a multi-stage bleaching process. In some embodiments, the method is implemented in a five-stage bleaching process having a sequence of $D_0E_1D_1E_2D_2$, wherein the second ($E_1$) and fourth stage ($E_2$) are used for oxidizing kraft fiber. According to some embodiments, like the one described, the bleaching sequence does not have any alkaline stages. Therefore, in some embodiments, the present process is an acidic bleaching sequence. Further, contrary to what the art predicts, the acidic bleaching sequence does not suffer from a substantial loss of brightness and whiteness.

Alternatively, the multi-stage bleaching sequence may be altered to provide more robust bleaching conditions prior to oxidizing the cellulose fiber. In some embodiments, the method comprises providing more robust bleaching conditions prior to the oxidation step. More robust bleaching conditions may allow the degree of polymerization and/or viscosity of the cellulose fiber to be reduced in the oxidation step with lesser amounts of iron or copper and/or hydrogen peroxide. Thus, it may be possible to modify the bleaching sequence conditions so that the brightness and/or viscosity of the final cellulose product can be further controlled. For instance, reducing the amounts of peroxide and metal, while providing more robust bleaching conditions before oxidation, may provide a product with lower viscosity and higher brightness than an oxidized product produced with identical oxidation conditions but with less robust bleaching. Such conditions may be advantageous in some embodiments, particularly in cellulose ether applications.

In some embodiments, for example, the method of oxidizing cellulose fiber within the scope of the disclosure may involve acidifying the kraft pulp to a pH ranging from about 2 to about 5 (using for example sulfuric acid), mixing a source of iron (for example ferrous sulfate, for example ferrous sulfate heptahydrate) with the acidified kraft pulp at an application of from about 25 to about 250 ppm $Fe^{+2}$ based on the dry weight of the kraft pulp at a consistency ranging from about 1% to about 15% and also hydrogen peroxide, which can be added as a solution at a concentration of from about 1% to about 50% by weight and in an amount ranging from about 0.1% to about 2.0% based on the dry weight of the kraft pulp. In some embodiments, the ferrous sulfate solution is mixed with the kraft pulp at a consistency ranging from about 7% to about 15%. In some embodiments the acidic kraft pulp is mixed with the iron source and reacted with the hydrogen peroxide for a time period ranging from about 40 to about 240 minutes at a temperature ranging from about 60 to about 80° C.

In some embodiments, each stage of the five-stage bleaching process includes at least a mixer, a reactor, and a washer (as is known to those of skill in the art).

In accordance with the disclosure, the fiber is further subjected to at least one carboxylating acid treatment, such as chlorous acid treatment. Chlorous acid treatment of oxidized cellulose fiber involves treating the oxidized cellulose fiber with a chlorous acid source, such as sodium chlorite and hydrogen peroxide or chlorine dioxide and hydrogen peroxide. In at least one embodiment, the method comprises acid treating oxidized cellulose fiber with sodium chlorite and hydrogen peroxide. In another embodiment, the method comprises acid treating oxidized cellulose fiber with chlorine dioxide and hydrogen peroxide. In some embodiments, the cellulose fiber may be subjected to carboxylating acid treatment prior to oxidation. In some embodiments, the cellulose fiber may be subjected to carboxylating acid treatment both prior to and after oxidation.

In some embodiments, the method comprises acid treating the oxidized cellulose fiber in one or more stages of a multi-stage bleaching sequence. In some embodiments, the oxidized cellulose fiber may be acid treated in the first, third, and/or fifth stage of a multi-stage bleaching sequence, for example, a five-stage bleaching sequence. In some embodiments, the oxidized cellulose fiber may be acid treated in one or more additional stages preceding or following the bleaching sequence.

In some embodiments, the carboxylating acid treatment is incorporated into the first stage of a multi-stage bleaching process. In some embodiments, the method is implemented in a five-stage bleaching process having a sequence of $D_0E_1D_1E_2D_2$, and the first stage ($D_0$) is used for the carboxylating acid treatment of the kraft fiber.

In some embodiments, the carboxylating acid treatment is incorporated into the third stage of a multi-stage bleaching process. In some embodiments, the method is implemented in a five-stage bleaching process having a sequence of $D_0E_1D_1E_2D_2$, and the third stage ($D_1$) is used for the carboxylating acid treatment of the kraft fiber.

In some embodiments, the carboxylating acid treatment is incorporated into the fifth stage of a multi-stage bleaching process. In some embodiments, the method is implemented in a five-stage bleaching process having a sequence of $D_0E_1D_1E_2D_2$, and the fifth stage ($D_2$) is used for the carboxylating acid treatment of the kraft fiber.

In some embodiments, the carboxylating acid treatment is incorporated into two or more stages of a multi-stage bleaching process. In some embodiments, the method is implemented in a five-stage bleaching process having a sequence of $D_0E_1D_1E_2D_2$, and the first ($D_0$) and third ($D_1$) stages, or the first ($D_0$) and fifth ($D_2$) stages, or the third ($D_1$) and fifth ($D_2$) stages, or the first ($D_0$), third ($D_1$), and fifth ($D_2$) stages are used for the carboxylating acid treatment of the kraft fiber.

In some embodiments, the carboxyl context increases after acid treatment of the cellulose fiber. It is believed that the carboxylating acid treatment converts aldehyde functional groups to carboxyl functional groups. Accordingly, the carboxyl content of oxidized acid-treated kraft fiber is elevated relative to the carboxyl content of prior oxidized kraft fiber. Conversion of aldehyde functional groups to carboxyl functional groups beneficially reduces the oxidized cellulose's sensitivity to degradation from subsequent alkaline treatment.

In accordance with the disclosure, the acid treatment is carried out for a time and at a temperature that is sufficient to produce the desired completion of the reaction. For example, the acid treatment may be carried out at a temperature of at least about 55° C., or at least about 80° C., and for a time ranging from about 15 to about 120 minutes, for example from about 15 to about 60 minutes, or from about 120 to about 150 minutes. The desired time and temperature of the acid treatment will be readily ascertainable by a person of skill in the art.

In accordance with the disclosure, a carboxylating acid source is added to the oxidized cellulose fiber in an amount sufficient to achieve the desired carboxyl functionality of the final cellulose product. For example, sodium chlorite or chlorine dioxide can be added to the oxidized cellulose fiber as a source of chlorous acid, as a solution at a concentration from about 0.6% to about 2.4%, for example from about 0.6% to about 2.0%, or from about 1.6% to about 2.4% by weight based on the dry weight of the pulp. Hydrogen peroxide can be added at a concentration of at least about 0.1%, at least about 0.15%, at least about 0.25%, or at least about 0.4%, for example from about 0.1% to about 0.6% or from about 0.6% to about 0.8% by weight based on the dry weight of the pulp.

According to one embodiment, the cellulose is subjected to a $D_0(EoP)D_1E_2D_2$ or a $D_0E_1D_1E_2D_2$ bleaching sequence. According to this embodiment, the first D stage ($D_0$) of the bleaching sequence is carried out at a temperature of at least about 55° C., for example at least about 60° C., for example, at least about 66° C., for example at least about 71° C., for example from about 55° C. to about 80° C., and at a pH of less than about 3, for example about 2.5. Chlorine dioxide is applied in an amount of greater than about 0.5% on pulp, for example, greater than about 0.8% on pulp, for example about 0.9% on pulp, for example from about 0.5 to about 2.0%. Acid is applied to the cellulose in an amount sufficient to maintain the pH, for example, in an amount of at least about 1% on pulp, for example, at least about 1.15% on pulp, for example, at least about 1.25% on pulp.

According to one embodiment, the first D stage ($D_0$) of the bleaching sequence is chlorous acid treatment. The $D_0$ stage may be carried out at a temperature of at least about 55° C., at least about 60° C., at least about 66° C., or at least about 71° C., for example from about 55° C. to about 80° C., or at a temperature of at least about 80° C., for a time period ranging from about 15 to about 120 minutes, for example from about 15 to about 60 minutes, or from about 120 to 150 minutes, and at a pH of less than 3, for example about 2.5. Sodium chlorite or chlorine dioxide at a concentration from about 0.5 to about 2.5%, for example from about 0.5 to about 2.0%, or from about 1.6% to about 2.5% by weight based on the dry weight of the pulp can be used to generate the chlorous acid. Hydrogen peroxide can be added at a concentration from about 0.1 to about 0.8%, for example, from about 0.1 to about 0.6%, or from about 0.6% to about 0.8% by weight based on the dry weight of the pulp. If chlorine dioxide is used to generate chlorous acid, additional hydrogen peroxide may be added.

According to one embodiment, the first E stage ($E_1$, EoP) is carried out at a temperature of at least about 74° C., for example at least about 77° C., for example at least about 79° C., for example at least about 82° C., and at a pH of greater than about 11, for example, greater than 11.2, for example about 11.4. Caustic is applied in an amount of greater than about 0.7% on pulp, for example, greater than about 0.8% on pulp, for example greater than about 1.0% on pulp, for example, about 1.5% on pulp. Oxygen is applied to the cellulose in an amount of at least about 0.48% on pulp, for example, at least about 0.5% on pulp, for example, at least about 0.53% on pulp. Hydrogen Peroxide is applied to the cellulose in an amount of at least about 0.35% on pulp, for example at least about 0.37% on pulp, for example, at least about 0.38% on pulp, for example, at least about 0.4% on pulp, for example, at least about 0.45% on pulp. The skilled artisan would recognize that any known peroxygen compound could be used to replace some or all of the hydrogen peroxide.

According to another embodiment, if oxidation is carried out in the $E_1$ stage ($E_1$), it may be carried out at a temperature of at least about 75° C., for example at least about 80° C., for example at least about 82° C. and at a pH of less than about 3.5, for example, less than 3.0, for example, less than about 2.8. An iron catalyst is added in, for example, aqueous solution at a rate of from about 25 to about 200 ppm $Fe^{+2}$, for example, from 50 to 150 ppm, for example, from 25 to 150 ppm, iron on pulp. Hydrogen Peroxide can be applied to the cellulose at a low level, i.e., in an amount of less than about 0.5% on pulp, for example, less than about 0.3% on pulp, for example, about 0.25% on pulp. Alternatively, the hydrogen peroxide may be applied at a high level, i.e., 1% or more on pulp, for example, 1.5% or more on pulp, for example, 2.0% or more on pulp. The skilled artisan would recognize that any known peroxygen compound could be used to replace some or all of the hydrogen peroxide.

According to one embodiment, the second D stage ($D_1$) of the bleaching sequence is carried out at a temperature of at least about 74° C., for example at least about 77° C., for example, at least about 79° C., for example, at least about 82° C. and at a pH of less than about 4, for example less than 3.5, for example less than 3.2. Chlorine dioxide is applied in an amount of less than about 1% on pulp, for example, less than about 0.8% on pulp, for example about 0.7% on pulp. Caustic is applied to the cellulose in an amount effective to adjust to the desired pH, for example, in an amount of less than about 0.015% on pulp, for example, less than about 0.01% pulp, for example, about 0.0075% on pulp. The TAPPI viscosity of the pulp after this bleaching stage may be 9-12 mPa·s, for example or may be lower, for example 6.5 mPa·s or less.

According to one embodiment, the second D stage ($D_1$) of the bleaching sequence is chlorous acid treatment. The $D_1$ stage may be carried out at a temperature of at least about 55° C., at least about 60° C., at least about 77° C., or at least about 80° C., for example from about 55° C. to about 80° C., for a time period ranging from about 15 to about 120 minutes, for example from about 15 to about 60 minutes, or from about 120 to 150 minutes, and at a pH of less than 4, for example less than 3, for example about 2.5. Sodium chlorite or chlorine dioxide at a concentration from about 0.5 to about 2.5%, for example from about 0.5 to about 2.0%, or from about 1.6% to about 2.5% by weight based on the dry weight of the pulp can be used to generate the chlorous acid. Hydrogen peroxide can be added at a concentration from about 0.1 to about 0.8%, for example, from about 0.1 to about 0.6%, or from about 0.6% to about 0.8% by weight based on the dry weight of the pulp. If chlorine dioxide is used to generate chlorous acid, additional hydrogen peroxide may be added.

According to one embodiment, the second E stage ($E_2$) is carried out at a temperature of at least about 74° C., for example at least about 77° C., for example at least about 79° C., for example at least about 82° C., and at a pH of greater than about 11, for example, greater than 11.2, for example about 11.4. Caustic is applied in an amount of greater than about 0.7% on pulp, for example, greater than about 0.8% on pulp, for example greater than about 1.0% on pulp, for example, greater than 1.2% on pulp. Hydrogen Peroxide is applied to the cellulose in an amount of at least about 0.25% on pulp, for example at least about 0.28% on pulp, for example, about 3.0% on pulp. The skilled artisan would recognize that any known peroxygen compound could be used to replace some or all of the hydrogen peroxide.

According to one embodiment, if the second E stage ($E_2$) is an oxidation stage, it is carried out at a temperature of at least about 74° C., for example at least about 79° C. and at a pH of greater than about 2.5, for example, greater than 2.9, for example about 3.3. An iron catalyst is added in, for example, aqueous solution at a rate of from about 25 to about 200 ppm $Fe^{+2}$, for example, from 50 to 150 ppm, for example, from 50 to 100 ppm, iron on pulp. Hydrogen Peroxide can be applied to the cellulose at a low level, i.e., in an amount of less than about 0.5% on pulp, for example, less than about 0.3% on pulp, for example, about 0.25% on pulp. Alternatively, the hydrogen peroxide may be applied at a high level, i.e., 1% or more on pulp, for example, 1.5% or more on pulp, for example, 2.0% or more on pulp. The skilled artisan would recognize that any known peroxygen compound could be used to replace some or all of the hydrogen peroxide.

According to one embodiment, the third D stage ($D_2$) of the bleaching sequence is carried out at a temperature of at least about 74° C., for example at least about 77° C., for example, at least about 79° C., for example, at least about 82° C. and at a pH of less than about 4, for example less than about 3.8. Chlorine dioxide is applied in an amount of less than about 0.5% on pulp, for example, less than about 0.3% on pulp, for example about 0.15% on pulp.

According to one embodiment, the third D stage ($D_2$) of the bleaching sequence is chlorous acid treatment. The $D_2$ stage may be carried out at a temperature of at least about 55° C., at least about 60° C., at least about 77° C., or at least about 80° C., for example from about 55° C. to about 80° C., for a time period ranging from about 15 to about 120 minutes, for example from about 15 to about 60 minutes, or from about 120 to 150 minutes, and at a pH of less than 4, for example less than about 3, for example about 2.5. Sodium chlorite or chlorine dioxide at a concentration from about 0.5 to about 2.5%, for example from about 0.5 to about 2.0%, or from about 1.6% to about 2.5% by weight based on the dry weight of the pulp can be used to generate the chlorous acid. Hydrogen peroxide can be added at a concentration from about 0.1 to about 0.8%, for example, from about 0.1 to about 0.6%, or from about 0.6% to about 0.8% by weight based on the dry weight of the pulp. If chlorine dioxide is used to generate chlorous acid, additional hydrogen peroxide may be added.

The carboxyl content of the oxidized acid-treated pulp may be about 7.2 to 7.8 meq/100 g, with an aldehyde content of about 0.3 to 0.6 meq/100 g.

Accordingly, as described above, the fiber may be subject to one or more of the following sequences, where C/A refers to carboxylating acid treatment, OX stands for oxidation, and E refers to an E, EO, Ep, or EoP bleaching stage: $D_0(OX)D_1(OX)D_2$, (C/A)(OX)$D_1E_2D_2$, $D_0(OX)$(C/A)$E_2D_2$, $D_0(OX)D_1E_2$(C/A), (C/A)(OX)(C/A)$E_2D_2$, (C/A)(OX)$D_1E_2$(C/A), $D_0(OX)$(C/A)$E_2$(C/A), (C/A)(OX)(C/A)$E_2$(C/A), (C/A)$E_1D_1$(OX)$D_2$, $D_0E_1$(C/A)(OX)$D_2$, $D_0E_1D_1$(OX)(C/A), (C/A)$E_1$(C/A)(OX)$D_2$, (C/A)$E_1D_1$(OX)(C/A), $D_0E_1$(C/A)(OX)(C/A), (C/A)$E_1$(C/A)(OX)(C/A), (C/A)(OX)$D_1$(OX)$D_2$, $D_0$(OX)(C/A)(OX)$D_2$, $D_0$(OX)$D_1$(OX)(C/A), (C/A)(OX)(C/A)(OX)$D_2$, (C/A)(OX)$D_1$(OX)(C/A), $D_0$(OX)(C/A)(OX)(C/A), and (C/A)(OX)(C/A)(OX)(C/A).

Fiber produced as described may, in some embodiments, be treated with a surface active agent. The surface active agent for use in the present invention may be solid or liquid. The surface active agent can be any surface active agent, including by not limited to softeners, debonders, and surfactants that is not substantive to the fiber, i.e., which does not interfere with its specific absorption rate. As used herein a surface active agent that is "not substantive" to the fiber exhibits an increase in specific absorption rate of 30% or less as measured using the pfi test as described herein. According to one embodiment, the specific absorption rate is increased by 25% or less, such as 20% or less, such as 15% or less, such as 10% or less. Not wishing to be bound by theory, the addition of surfactant causes competition for the same sites on the cellulose as the test fluid. Thus, when a surfactant is too substantive, it reacts at too many sites reducing the absorption capability of the fiber.

As used herein PFI is measured according to SCAN-C-33:80 Test Standard, Scandinavian Pulp, Paper and Board Testing Committee. The method is generally as follows. First, the sample is prepared using a PFI Pad Former. Turn on the vacuum and feed approximately 3.01 g fluff pulp into the pad former inlet. Turn off the vacuum, remove the test piece and place it on a balance to check the pad mass. Adjust the fluff mass to 3.00±0.01 g and record as $Mass_{dry}$. Place the fluff into the test cylinder. Place the fluff containing cylinder in the shallow perforated dish of an Absorption Tester and turn the water valve on. Gently apply a 500 g load to the fluff pad while lifting the test piece cylinder and promptly press the start button. The Tester will run for 30 seconds before the display will read 00.00. When the display reads 20 seconds, record the dry pad height to the nearest 0.5 mm ($Height_{dry}$). When the display again reads 00.00, press the start button again to prompt the tray to automatically raise the water and then record the time display (absorption time, T). The Tester will continue to run for 30 seconds. The water tray will automatically lower and the time will run for another 30 seconds. When the display reads 20 seconds, record the wet pad height to the nearest 0.5 mm ($Height_{wet}$). Remove the sample holder, transfer the wet pad to the balance for measurement of $Mass_{wet}$ and shut off the water valve. Specific Absorption Rate (s/g) is $T/Mass_{dry}$. Specific Capacity (g/g) is ($Mass_{wet}-Mass_{dry}$)/$Mass_{dry}$. Wet Bulk (cc/g) is [19.64 $cm^2 \times Height_{wet}$/3]/10. Dry Bulk is [19.64 $cm^2 \times Height_{dry}$/3]/10. The reference standard for comparison with the surfactant treated fiber is an identical fiber without the addition of surfactant.

It is generally recognized that softeners and debonders are often available commercially only as complex mixtures rather than as single compounds. While the following discussion will focus on the predominant species, it should be understood that commercially available mixtures would generally be used in practice. Suitable softener, debonder and surfactants will be readily apparent to the skilled artisan and are widely reported in the literature.

Suitable surfactants include cationic surfactants, anionic, and nonionic surfactants that are not substantive to the fiber. According to one embodiment, the surfactant is a non-ionic surfactant. According to one embodiment, the surfactant is a cationic surfactant. According to one embodiment, the surfactant is a vegetable based surfactant, such as a vegetable based fatty acid, such as a vegetable based fatty acid quaternary ammonium salt. Such compounds include DB999 and DB1009, both available from Cellulose Solutions. Other surfactants may be including, but not limited to Berol 388 an ethoxylated nonylphenol ether from Akzo Nobel.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functional with quaternary ammonium chloride and diester dierucyldimethyl ammonium chloride and are representative biodegradable softeners.

The surface active agent is added in an amount of up to 6 lbs/ton, such as from 0.5 lbs/ton to 3 lbs/ton, such as from 0.5 lbs/ton to 2.5 lbs/ton such as from 0.5 lbs/ton to 2 lbs/ton, such as less than 2 lbs/ton.

The surface active agent may be added at any point prior to forming rolls, bales, or sheets of pulp. According to one embodiment, the surface active agent is added just prior to the headbox of the pulp machine, specifically at the inlet of the primary cleaner feed pump.

According to one embodiment of the invention, the surfactant treated fiber of the invention exhibits a limited increase in specific absorption rate, e.g., less than 30% with a concurrent decrease in filterability, e.g., at least 10%. According to one embodiment, the surfactant treated fiber has an increased specific absorption rate of less than 30% and a decreased filterability of at least 20%, such as at least 30%, such as at least 40%. According to another embodiment, the surfactant treated fiber has an increased specific absorption rate of less than 25% and a decreased filterability of at least 10%, such as at least about 20%, such as at least 30%, such as at least 40%. According to yet another embodiment, the surfactant treated fiber has an increased specific absorption rate of less than 20% and a decreased filterability of at least 10%, such as at least about 20%, such as at least 30%, such as at least 40%. According to another embodiment, the surfactant treated fiber has an increased specific absorption rate of less than 15% and a decreased filterability of at least 10%, such as at least about 20%, such as at least 30%, such as at least 40%. According to still another embodiment, the surfactant treated fiber has an increased specific absorption rate of less than 10% and an decreased filterability of at least 10%, such as at least about 20%, such as at least 30%, such as at least 40%.

If the fiber of the present disclosure is used in the production of viscose, the use of a surfactant improves filterability. Fiber according to the disclosure, when treated with a surfactant according to the invention separates the fiber in a way that improves caustic penetration and filterability. Thus, according to one embodiment fibers of the present disclosure can be used as a substitute for expensive cotton or sulfite fiber to a greater extent than either untreated fiber or prior art fiber has been.

In some embodiments, the disclosure provides a method for controlling odor, comprising providing a kraft fiber according to the disclosure, and applying an odorant to the kraft fiber such that the atmospheric amount of odorant is reduced in comparison with the atmospheric amount of odorant upon application of an equivalent amount of odorant to an equivalent weight of standard kraft fiber. In some embodiments the disclosure provides a method for controlling odor comprising inhibiting bacterial odor generation. In some embodiments, the disclosure provides a method for controlling odor comprising absorbing odorants, such as nitrogenous odorants, onto a kraft fiber. As used herein, "nitrogenous odorants" is understood to mean odorants comprising at least one nitrogen.

In some embodiments, the disclosure provides a method for producing fluff pulp, comprising providing kraft fiber of the disclosure and then producing a fluff pulp. For example, the method comprises bleaching kraft fiber in a multi-stage bleaching process, and then forming a fluff pulp. In at least one embodiment, the fiber is not refined after the multi-stage bleaching process.

In some embodiments, the kraft fiber is combined with at least one super absorbent polymer (SAP). In some embodiments, the SAP may by an odor reductant. Examples of SAP that can be used in accordance with the disclosure include, but are not limited to, Hysorb™ sold by the company BASF, Aqua Keep® sold by the company Sumitomo, and FAVOR®, sold by the company Evonik.

II. Kraft Fibers

Reference is made herein to "standard," "conventional," or "traditional," kraft fiber, kraft bleached fiber, kraft pulp or kraft bleached pulp. Such fiber or pulp is often described as a reference point for defining the improved properties of the present invention. As used herein, these terms are interchangeable and refer to the fiber or pulp which is identical in composition to and processed in a like standard manner. As used herein, a standard kraft process includes both a cooking stage and a bleaching stage under art recognized conditions. Standard kraft processing does not include a pre-hydrolysis stage prior to digestion.

Physical characteristics (for example, purity, brightness, fiber length and viscosity) of the kraft cellulose fiber mentioned in the specification are measured in accordance with protocols provided in the Examples section.

In some embodiments, oxidized acid-treated kraft fiber of the disclosure has a brightness equivalent to standard kraft fiber. In some embodiments, the modified cellulose fiber has a brightness of at least 85, 86, 87, 88, 89, or 90 ISO. In some embodiments, the brightness is no more than about 92. In some embodiments, the brightness ranges from about 85 to about 92, or from about 86 to about 91, or from about 87 to about 91, or from about 88 to about 91. In some embodiments, the brightness is greater than about 91.4 or 91.5 ISO. In some embodiments, the brightness ranges from about 90 to about 91.5.

In some embodiments, oxidized acid-treated cellulose according to the present disclosure has an R18 value in the range of from about 79% to about 89%, for instance R18 has a value of at least about 86%, for example, 87.5% to 88.2%, for example, at least about 87%, for example, at least about 87.5%, for example at least about 87.8%, for example at least about 88%.

In some embodiments, oxidized acid-treated kraft fiber according to the disclosure has an R10 value ranging from about 72% to about 82%, for example, at least about 82%, for example, at least about 83%, for example, at least about 84%, for example, at least about 85%. The R18 and R10 content is described in TAPPI T235. R10 represents the residual undissolved material that is left after extraction of the pulp with 10 percent by weight caustic and R18 represents the residual amount of undissolved material left after extraction of the pulp with an 18% caustic solution. Generally, in a 10% caustic solution, hemicellulose and chemically degraded short chain cellulose are dissolved and removed in solution. In contrast, generally only hemicellulose is dissolved and removed in an 18% caustic solution. Thus, the difference between the R10 value and the R18 value, (ΔR=R18−R10), represents the amount of chemically degraded short chained cellulose that is present in the pulp sample.

In some embodiments, oxidized acid-treated cellulose fiber has an S10 caustic solubility ranging from about 14% to about 22%, or from about 16% to about 20%. In some embodiments, modified cellulose fiber has an S18 caustic solubility ranging from less than about 16%, for example less than about 14.5%, for example, less than about 12.5%, for example, less than about 12.3%, for example, about 12%.

The present disclosure provides kraft fiber with low and ultra-low viscosity. Unless otherwise specified, "viscosity" as used herein refers to 0.5% Capillary CED viscosity measured according to TAPPI T230-om99 as referenced in the protocols.

Unless otherwise specified, "DP" as used herein refers to average degree of polymerization by weight (DPw) calculated from 0.5% Capillary CED viscosity measured according to TAPPI T230-om99. See, e.g. J. F. Cellucon Conference in *The Chemistry and Processing of Wood and Plant Fibrous Materials*, p. 155, test protocol 8, 1994 (Woodhead Publishing Ltd., Abington Hall, Abinton Cambridge CBI 6AH England, J. F. Kennedy et al. eds.) "Low DP" means a DP ranging from about 1160 to about 1860 or a viscosity ranging from about 7 to about 13 mPa·s. "Ultra low DP" fibers means a DP ranging from about 350 to about 1160 or a viscosity ranging from about 3 to about 7 mPa·s.

Without wishing to be bound by theory, it is believed that the fiber of the present invention presents an artificial Degree of Polymerization when DP is calculated via CED viscosity measured according to TAPPI T230-om99. Specifically, it is believed that the catalytic oxidation treatment of the fiber of the present invention doesn't break the cellulose down to the extent indicated by the measured DP, but instead largely has the effect of opening up bonds and adding substituents that make the cellulose more reactive, instead of cleaving the cellulose chain. It is further believed that the CED viscosity test (TAPPI T230-om99), which begins with the addition of caustic, has the effect of cleaving the cellulose chain at the new reactive sites, resulting in a cellulose polymer which has a much higher number of shorter segments than are found in the fiber's pre-testing state. This is confirmed by the fact that the fiber length is not significantly diminished during production.

In some embodiments, oxidized acid-treated cellulose fiber has a viscosity ranging from about 3.0 mPa·s to about 6 mPa·s. In some embodiments, the viscosity ranges from about 4.0 mPa·s to about 5.5 mPa·s. In some embodiments, the viscosity ranges from about 4.5 mPa·s to about 5.5 mPa·s. In some embodiments, the viscosity ranges from about 5.0 mPa·s to about 5.5 mPa·s. In some embodiments, the viscosity is less than 6 mPa·s, less than 5.5 mPa·s, less than 5.0 mPa·s, less than 4.5 mPa·s, or less than 3.5 mPa·s.

In some embodiments, kraft fiber of the disclosure is more compressible and/or embossable than standard kraft fiber. In some embodiments, kraft fiber may be used to produce structures that are thinner and/or have higher density than structures produced with equivalent amounts of standard kraft fiber.

In some embodiments, kraft fiber of the disclosure maintains its fiber length during the bleaching process.

"Fiber length" and "average fiber length" are used interchangeably when used to describe the property of a fiber and mean the length-weighted average fiber length. Therefore, for example, a fiber having an average fiber length of 2 mm should be understood to mean a fiber having a length-weighted average fiber length of 2 mm.

In some embodiments, when the kraft fiber is a softwood fiber, the cellulose fiber has an average fiber length, as measured in accordance with Test Protocol 12, described in the Example section below, that is about 2 mm or greater. In some embodiments, the average fiber length is no more than about 3.7 mm. In some embodiments, the average fiber length is at least about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, or about 3.7 mm. In some embodiments, the average fiber length ranges from about 2 mm to about 3.7 mm, or from about 2.2 mm to about 3.7 mm.

In some embodiments, the oxidized acid-treated kraft fiber of the disclosure has increased carboxyl content relative to modified kraft fiber subject to catalytic oxidation but not carboxylating acid treatment and further relative to standard kraft fiber.

In some embodiments, oxidized acid-treated kraft fiber has a carboxyl content ranging from about 6 meq/100 g to about 12 meq/100 g. In some embodiments, the carboxyl content ranges from about 6 meq/100 g to about 8 meq/100 g. In some embodiments, the carboxyl content is at least about 6 meq/100 g, for example, at least about 6.5 meq/100 g, for example, at least about 7.0 meq/100 g, at least about 7.5 meq/100 g, for example, and at least about 8.0 meq/100 g, for example.

In some embodiments, oxidized acid-treated kraft fiber has an aldehyde content of less than 1.5 meq/100 g, for example, less than about 1.0 meq/100 g, for example, ranging from about 0.1 to about 0.6 meq/100 g, such as from about 0.3 to about 0.6 meq/100 g. In some embodiments, the oxidized acid-treated kraft fiber of the disclosure has reduced aldehyde content and increased carboxyl content relative to kraft fiber subject to catalytic oxidation but not carboxylating acid treatment. Aldehyde functionality contributes to yellowing and brightness reversion. In some embodiments, the oxidized acid-treated kraft fiber of the disclosure exhibits reduced yellowing and reduced brightness reversion.

In some embodiments, oxidized acid-treated kraft fiber of the disclosure has a carbonyl content of less than about 5 meq/100 g, for example, ranging from about 2.5 meq/100 g to about 5.0 meq/100 g. In some embodiments, the carbonyl content is less than about 2.5 meq/100 g, for example, from about 0.5 to about 2.5 meq/100 g.

Kraft fiber of the disclosure may be more flexible than standard kraft fiber, and may elongate and/or bend and/or exhibit elasticity and/or increase wicking. Additionally, it is expected that the kraft fiber of the disclosure would be softer than standard kraft fiber, enhancing their applicability in absorbent product applications, for example, such as diaper and bandage applications.

In some embodiments, the oxidized acid-treated cellulose fiber has a copper number less than about 2.3. In some embodiments, the copper number is less than about 2.0, for example, less than about 1.5. In some embodiments, the copper number is less than about 1.3, for example, less than about 0.9. In some embodiments, the copper number is less than about 0.5.

In at least one embodiment, the hemicellulose content of the oxidized acid-treated kraft fiber is substantially the same as standard unbleached kraft fiber. For example, the hemicellulose content for a softwood kraft fiber may range from about 11% to about 21%, for example, from about 12% to about 17%. For instance, the hemicellulose content of a hardwood kraft fiber may range from about 12.5% to about 16.5%.

III. Products Made from Kraft Fibers

The present disclosure provides products made from the oxidized acid-treated kraft fiber described herein. In some embodiments, the products are those typically made from standard kraft fiber. In other embodiments, the products are those typically made from cotton linter, pre-hydrolsis kraft or sulfite pulp. More specifically, fiber of the present invention can be used, without further modification, in the production of absorbent products and as a starting material in the preparation of chemical derivatives, such as ethers and esters.

In some embodiments, the disclosure provides a method for producing fluff pulp. For example, the method comprises bleaching kraft fiber in a multi-stage bleaching process, and then forming a fluff pulp. In at least one embodiment, the fiber is not refined after the multi-stage bleaching process.

In some embodiments, the products are absorbent products, including, but not limited to, medical devices, including wound care (e.g. bandage), baby diapers nursing pads, adult incontinence products, feminine hygiene products, including, for example, sanitary napkins and tampons, air-laid non-woven products, air-laid composites, "table-top" wipers, napkin, tissue, towel and the like. In some embodiments, the kraft fiber of the present invention exhibits improved bacteriostatic properties, making it suitable for absorbent products in contact with skin. Absorbent products according to the present disclosure may be disposable. In some embodiments, fiber according to the invention can be used as a whole or partial substitute for the bleached hardwood or softwood fiber that is typically used in the production of these products.

In some embodiments, the kraft fiber of the present invention is in the form of fluff pulp and has one or more properties that make the kraft fiber more effective than conventional fluff pulps in absorbent products. More specifically, kraft fiber of the present invention may have improved compressibility which makes it desirable as a substitute for currently available fluff pulp fiber. Because of the improved compressibility of the fiber of the present disclosure, it is useful in embodiments which seek to produce thinner, more compact absorbent structures. One skilled in the art, upon understanding the compressible nature of the fiber of the present disclosure, could readily envision absorbent products in which this fiber could be used. By way of example, in some embodiments, the disclosure provides an ultrathin hygiene product comprising the kraft fiber of the disclosure. Ultra-thin fluff cores are typically used in, for example, feminine hygiene products or baby diapers. Other products which could be produced with the fiber of the present disclosure could be anything requiring an absorbent core or a compressed absorbent layer. When compressed, fiber of the present invention exhibits no or no substantial loss of absorbency, but shows an improvement in flexibility.

The cellulose fibers of the disclosure exhibit antiviral and/or antimicrobial activity. The cellulose fibers of the present invention are useful in the production of articles that would come into contact with microbes, viruses or bacteria and thus, would benefit from inhibition of the growth of those infectious agents. Absorbent articles or devices include bandages, bandaids, medical gauze, absorbent dressings and pads, medical gowning, paper for medical tables, and incontinence pads for hospital use, just to name a few. The fiber of the disclosure can be included within, e.g., can be a portion of, or can make-up the entire absorbent portion of the absorbent device.

Fiber of the present invention may, without further modification, also be used in the production of absorbent products including, but not limited to, tissue, towel, napkin and other paper products which are formed on a traditional papermaking machine. Traditional papermaking processes involve the preparation of an aqueous fiber slurry which is typically deposited on a forming wire where the water is thereafter removed. The kraft fibers of the present disclosure may provide improved product characteristics in products including these fibers. In some embodiments, the oxidized acid-treated fiber of the present invention may exhibit improved water absorptive capacity and improved dry and wet strength, making it suitable for absorbent products, including tissue and towel-type applications.

In some embodiments, the kraft fiber is combined with at least one super absorbent polymer (SAP). In some embodiments, the SAP may by an odor reductant. Examples of SAP that can be used in accordance with the disclosure include, but are not limited to, Hysorb™ sold by the company BASF, Aqua Keep® sold by the company Sumitomo, and FAVOR®, sold by the company Evonik.

In some embodiments, the disclosure provides a method for controlling odor, comprising providing an oxidized acid-treated kraft fiber according to the disclosure, and optionally applying an odorant to the kraft fiber such that the atmospheric amount of odorant is reduced in comparison with the atmospheric amount of odorant upon application of an equivalent amount of odorant to an equivalent weight of standard kraft fiber. In some embodiments the disclosure provides a method for controlling odor comprising inhibiting bacterial odor generation. In some embodiments, the disclosure provides a method for controlling odor comprising absorbing odorants, such as nitrogenous odorants, onto a oxidized acid-treated kraft fiber. As used herein, "nitrogenous odorants" is understood to mean odorants comprising at least one nitrogen.

IV. Acid/Alkaline Hydrolyzed Products

The oxidized acid-treated kraft fiber of the instant disclosure may in some instances be used as a substitute for cotton linter or sulfite pulp, for example in the manufacture of cellulose ethers, cellulose acetates, viscose, and microcrystalline cellulose.

In some embodiments, the oxidized acid-treated kraft fiber has chemical properties that make it suitable for the manufacture of cellulose ethers. Thus, the disclosure provides a cellulose ether derived from a oxidized acid-treated kraft fiber as described. In some embodiments, the cellulose ether is chosen from ethylcellulose, methylcellulose, hydroxypropyl cellulose, carboxymethyl cellulose, hydroxypropyl methylcellulose, and hydroxyethyl methyl cellulose. It is believed that the cellulose ethers of the disclosure may be used in any application where cellulose ethers are traditionally used. For example, and not by way of limitation, the cellulose ethers of the disclosure may be used in coatings, inks, binders, controlled release drug tablets, and films.

In some embodiments, the oxidized acid-treated kraft fiber has chemical properties that make it suitable for the manufacture of cellulose esters. Thus, the disclosure provides a cellulose ester, such as a cellulose acetate, derived from modified kraft fibers of the disclosure. In some embodiments, the disclosure provides a product comprising a cellulose acetate derived from the oxidized acid-treated kraft fiber of the disclosure. For example, and not by way of limitation, the cellulose esters of the disclosure may be used in, home furnishings, cigarette filters, inks, absorbent products, medical devices, and plastics including, for example, LCD and plasma screens and windshields.

In some embodiments, the oxidized acid-treated kraft fiber of the disclosure may be suitable for the manufacture of viscose. More particularly, the oxidized acid-treated kraft fiber of the disclosure may be used as a partial substitute for expensive cellulose starting material. The oxidized acid-treated kraft fiber of the disclosure may replace as much as 15% or more, for example as much as 10%, for example as much as 5%, of the expensive cellulose starting materials. Thus, the disclosure provides a viscose fiber derived in whole or in part from a oxidized acid-treated kraft fiber as described. In some embodiments, the viscose is produced from oxidized acid-treated kraft fiber of the present disclosure that is treated with alkali and carbon disulfide to make a solution called viscose, which is then spun into dilute sulfuric acid and sodium sulfate to reconvert the viscose into cellulose. It is believed that the viscose fiber of the disclosure may be used in any application where viscose fiber is traditionally used. For example, and not by way of limitation, the viscose of the disclosure may be used in rayon, cellophane, filament, food casings, and tire cord.

In some embodiments, the oxidized acid-treated kraft fiber is suitable for the manufacture of microcrystalline cellulose. Microcrystalline cellulose production requires relatively clean, highly purified starting cellulosic material. As such, traditionally, expensive sulfite pulps have been predominantly used for its production. The present disclosure provides microcrystalline cellulose derived from kraft fiber of the disclosure. Thus, the disclosure provides a cost-effective cellulose source for microcrystalline cellulose production.

The cellulose of the disclosure may be used in any application that microcrystalline cellulose has traditionally been used. For example, and not by way of limitation, the cellulose of the disclosure may be used in pharmaceutical or nutraceutical applications, food applications, cosmetic applications, paper applications, or as a structural composite. For instance, the cellulose of the disclosure may be a binder, diluent, disintegrant, lubricant, tabletting aid, stabilizer, texturizing agent, fat replacer, bulking agent, anticaking agent, foaming agent, emulsifier, thickener, separating agent, gelling agent, carrier material, opacifier, or viscosity modifier. In some embodiments, the microcrystalline cellulose is a colloid.

Other products comprising cellulose derivatives and microcrystalline cellulose derived from kraft fibers according to the disclosure may also be envisaged by persons of ordinary skill in the art. Such products may be found, for example, in cosmetic and industrial applications.

Fiber for use in the production of chemical derivatives can be sensitive to the level of functionality that has been imparted by the oxidation process. Specifically, aldehyde groups can be a source of brightness reversion as the fiber ages. Fiber for use in the production of chemical derivatives and viscose ideally has a low viscosity and concurrently a low aldehyde content. The addition of oxygen to any of the oxidation stages has little effect on viscosity but materially reduces the aldehyde functionality of the fiber. Without wishing to be bound by theory, it is believed that the aldehyde groups are being oxidized to carbon dioxide and are released.

Thus, according to one embodiment of the invention oxygen is introduced at one or more of the catalytic oxidation stages to reduce the level of aldehyde functionality. The use of oxygen during the catalytic oxidation process can be used to reduce aldehyde content in process where the fiber is before and/or later treated with a carboxylating acid and in processes where it is not. Fiber that has been treated in an oxidation stage that includes oxygen can have an aldehyde content of less than about 4 meq/100 g, for example, less than 3.5 meq/100 g, for example, less than 3.2 meq/100 g.

The levels of oxygen added to the oxidation stage are from about 0.1% to about 1%, for example from about 0.3% to about 0.7%, for example, from about 0.4% to about 0.5%, for about 0.5% to about 0.6%.

As used herein, "about" is meant to account for variations due to experimental error. All measurements are understood to be modified by the word "about", whether or not "about" is explicitly recited, unless specifically stated otherwise. Thus, for example, the statement "a fiber having a length of 2 mm" is understood to mean "a fiber having a length of about 2 mm."

The details of one or more non-limiting embodiments of the invention are set forth in the examples below. Other embodiments of the invention should be apparent to those of ordinary skill in the art after consideration of the present disclosure.

EXAMPLES

Test Protocols

1. Caustic solubility (R10, S10, R18, S18) is measured according to TAPPI T235-cm00.
2. Carboxyl content is measured according to TAPPI T237-cm98.
3. Aldehyde content is measured according to Econotech Services LTD, proprietary procedure ESM 055B.
4. Copper Number is measured according to TAPPI T430-cm99.
5. Carbonyl content is calculated from Copper Number according to the formula: carbonyl=(Cu. No.−0.07)/0.6, from *Biomacromolecules* 2002, 3, 969-975.
6. 0.5% Capillary CED Viscosity is measured according to TAPPI T230-om99.
7. Intrinsic Viscosity is measured according to ASTM D1795 (2007).
8. DP is calculated from 0.5% Capillary CED Viscosity according to the formula: $DP_w$=−449.6+598.4 ln(0.5% Capillary CED)+118.02 $\ln^2$(0.5% Capillary CED), from the 1994 Cellucon Conference published in *The Chemistry and Processing Of Wood And Plant Fibrous Materials*, p. 155, woodhead Publishing Ltd, Abington Hall, Abington, Cambridge CBI 6AH, England, J. F. Kennedy, et al. editors.
9. Carbohydrates are measured according to TAPPI T249-cm00 with analysis by Dionex ion chromatography.
10. Cellulose content is calculated from carbohydrate composition according to the formula: Cellulose=Glucan−(Mannan/3), from *TAPPI Journal* 65(12):78-80 1982.
11. Hemicellulose content is calculated from the sum of sugars minus the cellulose content.
12. Fiber length and coarseness is determined on a Fiber Quality Analyzer™ from OPTEST, Hawkesbury, Ontario, according to the manufacturer's standard procedures.

13. DCM (dichloromethane) extractives are determined according to TAPPI T204-cm97.
14. Iron content is determined by acid digestion and analysis by ICP.
15. Ash content is determined according to TAPPI T211-om02.
16. Brightness is determined according to TAPPI T525-om02.
17. CIE Whiteness is determined according to TAPPI Method T560.
18. Kappa number is determined according to TAPPI T236 cm-85.

Example 1 (Fourth Stage Oxidation)

Methods of Preparing Fibers of the Disclosure

Southern pine chips were cooked in a two vessel continuous digester with Lo-Solids® downflow cooking. The white liquor application was 8.42% as effective alkali (EA) in the impregnation vessel and 8.59% in the quench circulation. The quench temperature was 166° C. The kappa no. after digesting was 20.4. The brownstock pulp was further delignified in a two stage oxygen delignification system with 2.98% sodium hydroxide (NaOH) and 2.31% oxygen ($O_2$) applied. The temperature was 98° C. The first reactor pressure was 758 kPa and the second reactor was 372 kPa. The kappa no. was 6.95.

The oxygen delignified pulp was bleached in a 5 stage bleach plant. The first chlorine dioxide stage (D0) was carried out with 0.90% chlorine dioxide ($ClO_2$) applied at a temperature of 61° C. and a pH of 2.4.

The second or oxidative alkaline extraction stage (EOP) was carried out at a temperature of 76° C. NaOH was applied at 0.98%, hydrogen peroxide ($H_2O_2$) at 0.44%, and oxygen ($O_2$) at 0.54%. The kappa no. after oxygen delignification was 2.1.

The third or chlorine dioxide stage (D1) was carried out at a temperature of 74° C. and a pH of 3.3. $ClO_2$ was applied at 0.61% and NaOH at 0.02%. The 0.5% Capillary CED viscosity was 10.0 mPa·s.

The fourth stage was altered to produce a low degree of polymerization pulp. Ferrous sulfate heptahydrate ($FeSO_4 \cdot 7H_2O$) was added as a 2.5 lb/gal aqueous solution at a rate to provide 75 ppm $Fe^{+2}$ on pulp at the repulper of the D1 washer. The pH of the stage was 3.3 and the temperature was 80° C. $H_2O_2$ was applied at 0.26% on pulp at the suction of the stage feed pump.

The fifth or final chlorine dioxide stage (D2) was carried out at a temperature of 80° C., and a pH of 3.9 with 0.16% $ClO_2$ applied. The viscosity was 5.0 mPa·s and the brightness was 90.0% ISO.

The iron content was 10.3 ppm, the measured extractives were 0.018%, and the ash content was 0.1%. Additional results are set forth in Table 1 below.

Example 2 (Second Stage Oxidation)

Southern pine chips were cooked in a two vessel continuous digester with Lo-Solids® downflow cooking. The white liquor application was 18.7% as effective alkali (EA) with half being added in the impregnation vessel and half being added in the quench circulation. The quench temperature was 165° C. The kappa no. after digesting averaged 14. The brownstock pulp was further delignified in a two stage oxygen delignification system with 2.84% sodium hydroxide (NaOH) and 1.47% oxygen ($O_2$) applied. The temperature was 92 to 94° C. The Kappa number was 5.6.

The oxygen delignified pulp was bleached in a 5 stage bleach plant. The first chlorine dioxide stage (D0) was carried out with 0.71% chlorine dioxide ($ClO_2$) applied at a temperature of 63° C. and a pH of 2.5. The Kappa number following the ($D_0$) stage was 1.7

The second stage was altered to produce a low degree of polymerization pulp. Ferrous sulfate heptahydrate ($FeSO_4 \cdot 7H_2O$) was added as a 2.5 lb/gal aqueous solution at a rate to provide 25 ppm $Fe^{+2}$, which was increased to 40 ppm $Fe^{+2}$ on pulp. The pH of the stage was 2.8 and the temperature was 82° C. $H_2O_2$ was applied at 0.25% on pulp at the suction of the stage feed pump.

The third or chlorine dioxide stage (D1) was carried out at a temperature of 79.5° C. and a pH of 2.9, $ClO_2$ was applied at 0.90% and NaOH at 10.43%. The 0.5% Capillary CED viscosity was between 5.4 and 6.1 mPa·s.

The fourth or alkaline extraction stage (EP) was carried out at a temperature of 76° C. NaOH was applied at 1.54%, and hydrogen peroxide ($H_2O_2$) at 0.28%. The pH was 11.3

The fifth or final chlorine dioxide stage (D2) was carried out at a temperature of 72° C., and a pH of 4.4 with 0.14% $ClO_2$ applied.

Fiber characteristics are set forth in Table 1, below.

Example 3 (WO 2010/138941)

Southern pine chips were cooked in a two vessel continuous digester with Lo-Solids® downflow cooking. The white liquor application was 8.32% as effective alkali (EA) in the impregnation vessel and 8.46% in the quench circulation. The quench temperature was 162° C. The kappa no. after digesting was 27.8. The brownstock pulp was further delignified in a two stage oxygen delignification system with 2.44% NaOH and 1.91% $O_2$ applied. The temperature was 97° C. The first reactor pressure was 779 kPa and the second reactor was 386 kPa. The kappa no. after oxygen delignification was 10.3.

The oxygen delignified pulp was bleached in a 5 stage bleach plant. The first chlorine dioxide stage (D0) was carried out with 0.94% $ClO_2$ applied at a temperature of 66° C. and a pH of 2.4.

The second or oxidative alkaline extraction stage (EOP) was carried out at a temperature of 83° C. NaOH was applied at 0.89%, $H_2O_2$ at 0.33%, and $O_2$ at 0.20%. The kappa no. after the stage was 2.9.

The third or chlorine dioxide stage (D1) was carried out at a temperature of 77° C. and a pH of 2.9. $ClO_2$ was applied at 0.76% and NaOH at 0.13%. The 0.5% Capillary CED viscosity was 14.0 mPa·s.

The fourth stage was altered to produce a low degree of polymerization pulp. Ferrous sulfate heptahydrate ($FeSO_4 \cdot 7H_2O$) was added as a 2.5 lb/gal aqueous solution at a rate to provide 150 ppm $Fe^{+2}$ on pulp at the repulper of the D1 washer. The pH of the stage was 2.6 and the temperature was 82° C. $H_2O_2$ was applied at 1.6% on pulp at the suction of the stage feed pump.

The fifth or final chlorine dioxide stage (D2) was carried out at a temperature of 85° C., and a pH of 3.35 with 0.13% $ClO_2$ applied. The viscosity was 3.6 mPa·s and the brightness was 88.7% ISO.

Each of the bleached pulps produced in the above examples were made into a pulp board on a Fourdrinier type pulp dryer with an airborne Fläkt dryer section. Samples of each pulp were collected and analyzed for chemical composition and fiber properties. The results are shown in Table 1.

TABLE 1

| Property | units | Example 1 | Example 2 | Example 3 |
|---|---|---|---|---|
| R10 | % | 81.5 | 84.2 | 71.6 |
| S10 | % | 18.5 | 15.7 | 28.4 |
| R18 | % | 85.4 | 87.6 | 78.6 |
| S18 | % | 14.6 | 12.2 | 21.4 |
| ΔR |  | 3.9 | 3.6 | 7.0 |
| Carboxyl | meq/100 g | 3.14 | 3.8 | 3.98 |
| Aldehydes | meq/100 g | 1.80 | 0.74 | 5.79 |
| Copper No. |  | 1.36 | 0.69 | 3.81 |
| Calculated Carbonyl* | mmole/100 g | 2.15 | 1.03 | 6.23 |
| CED Viscosity | mPa·s | 5.0 | 5.8 | 3.6 |
| Intrinsic Viscosity | [h] dl/g | 3.58 | 4.06 | 2.52 |
| Calculated DP*** | $DP_w$ | 819 | 967 | 511 |
| Glucan | % | 83.5 | 82.9 | 83.3 |
| Xylan | % | 7.6 | 7.4 | 7.6 |
| Galactan | % | <0.1 | 0.3 | 0.1 |
| Mannan | % | 6.3 | 5.8 | 6.3 |
| Arabinan | % | 0.4 | 0.3 | 0.2 |
| Calculated Cellulose** | % | 81.4 | 81.0 | 81.2 |
| Calculated Hemicellulose | % | 16.5 | 15.7 | 16.3 |

Example 4 (Carboxylating Acid Treatment)

Cellulose pulp prepared generally according to Example 1, i.e., five stage bleaching where oxidation is carried out in the fourth stage, was subject to a carboxylating acid treatment with chlorous acid in the fifth or D2 acid treatment stage.

The oxidation stage was carried out at a temperature of 80° C. and a pH of 2.65. An iron source was added at a rate to provide 150 ppm $Fe^{+2}$. $H_2O_2$ was applied at 1.5% on pulp.

The carboxylating acid treatment stage (D2) was carried out at a temperature of 80° C. and a pH of 2.69 with 0.6% $H_2O_2$ and 1.6% $NaClO_2$ applied.

Fiber characteristics are set forth in Table 2, below, comparing the fiber to itself as it moves along the bleaching sequence, specifically, after the D1 stage, after the fourth or oxidation stage and after the D2 or acid treatment stage.

TABLE 2

| Property | Unit(s) | Bleached Fiber (After Stage 3) | Oxidized Fiber (After Stage 4) | Oxidized Acid-Treated Fiber (After Stage 5) |
|---|---|---|---|---|
| Viscosity | cps | 7.68 | 3.25 | 3.25 |
| Carboxyl | meq/100 g | 3.15 | 3.66 | 7.28 |
| Aldehyde | meq/100 g | 0.14 | 4.73 | 0.64 |
| Copper No. |  | 0.36 | 4.15 | 1.61 |
| Carbonyl | meq/100 g | 0.48 | 6.8 | 2.62 |

Example 5 (Carboxylating Acid Treatment)

Cellulose pulp prepared generally according to Example 1, i.e., five stage bleaching where oxidation is carried out in the fourth stage, was subject to a carboxylating acid treatment with chlorous acid in the fifth or D2 acid treatment stage.

The fourth oxidation stage was carried out at a temperature of 80° C. and a pH of 2.05. An iron source was added at a rate to provide 300 ppm $Fe^{+2}$. $H_2O_2$ was applied at 3.0% on pulp at the suction of the stage feed pump.

The fifth or carboxylating acid treatment stage (D2) was carried out at a temperature of 80° C. and a pH of 2.86 with 0.8% $H_2O_2$ and 2.4% $NaClO_2$ applied.

Fiber characteristics are set forth in Table 3, below, comparing the fiber to itself as it moves along the bleaching sequence, specifically, after the D1 stage, and after the D2 or acid treatment stage.

TABLE 3

| Property | Unit(s) | Bleached Fiber (After Stage 3) | Oxidized Acid-Treated Fiber (After Stage 5) |
|---|---|---|---|
| Viscosity | cps | 7.68 | 3.64 |
| Carboxyl | meq/100 g | 3.15 | 7.77 |
| Aldehyde | meq/100 g | 0.14 | 0.36 |
| Copper No. |  | 0.36 | 1.58 |
| Carbonyl | meq/100 g | 0.48 | 2.52 |

Example 6

Southern pine chips were cooked in a two vessel continuous digester with Lo-Solids® downflow cooking. The white liquor application was 16% as effective alkali (EA) with half being added in the impregnation vessel and half being added in the quench circulation. The quench temperature was 162° C. The kappa no. after digesting averaged 30. The brownstock pulp was further delignified in a two stage oxygen delignification system with 3.1% sodium hydroxide (NaOH) and 2.0% oxygen ($O_2$) applied. The temperature was 92 to 94° C. The Kappa number was 12.7.

The oxygen delignified pulp was bleached in a 5 stage bleach plant. The first chlorine dioxide stage (D0) was carried out with 1.0% chlorine dioxide ($ClO_2$) applied at a temperature of 63° C. and a pH of 2.5.

The second stage was altered to produce a low degree of polymerization pulp. Ferrous sulfate heptahydrate ($FeSO_4 \cdot 7H_2O$) was added as a 2.5 lb/gal aqueous solution at a rate to provide 128 ppm $Fe^{+2}$. The pH of the stage was 3.2 and the temperature was 165° C. $H_2O_2$ was applied at 1.5% on pulp at the suction of the stage feed pump. The 0.5% Capillary CED viscosity was 4.7 mPa·s.

The third, a chlorous acid stage, (D1) was carried out at a temperature of 73° C. and a pH of 2.0, $ClO_2$ was applied at 1.4% and hydrogen peroxide ($H_2O_2$) at 0.4%. The 0.5% Capillary CED viscosity was 4.8 mPa·s.

The fourth or alkaline extraction stage (EP) was carried out at a pH of 10.6. NaOH was applied at 1.25%, and hydrogen peroxide ($H_2O_2$) at 0.4%. The 0.5% Capillary CED viscosity was 4.6 mPa·s.

The fifth or final chlorine dioxide stage (D2) was carried out at a temperature of 72° C., and a pH of 4.1 with 0.25% $ClO_2$ applied.

Fiber characteristics are set forth in Table 4, below.

TABLE 4

| Property | units | Example 6 |
|---|---|---|
| R10 | % | 79.8 |
| S10 | % | 20.2 |
| R18 | % | 85 |
| S18 | % | 15 |
| ΔR |  | 5.2 |
| Carboxyl | meq/100 g | 6.7 |
| Aldehydes | meq/100 g | 0.9 |
| Copper No. |  | 2 |
| Calculated Carbonyl* | mmole/100 g | 3.2 |
| CED Viscosity | mPa·s | 4.9 |
| Intrinsic Viscosity | [h] dl/g | 3.65 |

TABLE 4-continued

| Property | units | Example 6 |
|---|---|---|
| Calculated DP*** | $DP_w$ | 800 |
| Glucan | % | 85.1 |
| Xylan | % | 8.8 |
| Galactan | % | 0.2 |
| Mannan | % | 5.6 |
| Arabinan | % | 0.2 |
| Iron Content | ppm | 2.0 |

A number of embodiments have been described. Nevertheless, it will be understood that various modifications may be made without departing from the spirit and scope of the disclosure. Accordingly, other embodiments are within the scope of the following claims.

We claim:

1. A method of making an oxidized acid-treated kraft fiber comprising:
   subjecting cellulose fiber to a kraft pulping step;
   oxygen delignifying the cellulose fiber following the kraft pulping step; and
   bleaching the cellulose fiber following oxygen delignification using a multi-stage bleaching process;
   oxidizing the cellulose fiber with a peroxide and a catalyst under acidic conditions in at least one stage of the multi-stage bleaching process;
   treating the fiber with a carboxylating acid comprising the addition of a combination of either sodium chlorite and hydrogen peroxide or chlorine dioxide and hydrogen peroxide in at least one stage of the multi-stage bleaching process prior to the at least one oxidation stage; and
   treating the fiber with a carboxylating acid comprising the addition of a combination of either sodium chlorite and hydrogen peroxide or chlorine dioxide and hydrogen peroxide in at least one stage of the multi-stage bleaching process following the at least one oxidation stage
   wherein the multi-stage bleaching process is a five-stage bleaching process comprising a sequence chosen from one of (C/A)(OX)(C/A)$E_2D_2$, (C/A)(OX)$D_1E_2$(C/A), (C/A)(OX)(C/A)$E_2$(C/A), (C/A)$E_1D_1$(OX)(C/A), $D_0E_1$(C/A)(OX)(C/A), (C/A)$E_1$(C/A)(OX)(C/A), (C/A)(OX)(C/A)(OX)$D_2$, or (C/A)(OX)$D_1$(OX)(C/A),
   where C/A refers to a carboxylating acid stage, OX refers to an oxidation stage, D refers to a chlorine dioxide stage without the addition of hydrogen peroxide, and E refers to an E, EO, Ep, or EoP bleaching stage.

2. The method of claim 1, wherein the kappa number of the fiber after kraft pulping and oxygen delignification is from about 13 to about 21.

3. The method of claim 1, wherein the catalyst is an iron catalyst.

4. The method of claim 3, wherein the peroxide is hydrogen peroxide.

5. The method of claim 4, wherein the pH of the oxidation ranges from about 2 to about 6.

6. The method of claim 5, wherein the iron catalyst is chosen from at least one of ferrous sulfate, ferrous chloride, ferrous ammonium sulfate, ferric chloride, ferric ammonium sulfate, or ferric ammonium citrate and is added in an amount ranging from about 25 to about 150 ppm iron based on the dry weight of the cellulose fiber, and wherein the hydrogen peroxide in the at least one oxidation stage is added in an amount from about 0.1% to about 2% based on the dry weight of the cellulose fiber.

7. The method of claim 1, wherein the carboxylating acid treatment comprises the addition of sodium chlorite and hydrogen peroxide.

8. The method of claim 1, wherein the carboxylating acid treatment comprises the addition of chlorine dioxide and hydrogen peroxide.

9. The method of claim 1, further comprising treating the oxidized acid-treated kraft fiber with a surface active agent.

10. The method of claim 5, wherein the carboxylating acid treatment comprises the addition of sodium chlorite and hydrogen peroxide.

11. The method of claim 5, wherein the carboxylating acid treatment comprises the addition of chlorine dioxide and hydrogen peroxide.

12. The method of claim 11, wherein hydrogen peroxide is added in each carboxylating acid stage in an amount of at least about 0.15% by weight based on the dry weight of the pulp.

13. The method of claim 11, wherein the multi-stage bleaching process is (C/A)(OX)(C/A)$E_2D_2$.

14. The method of claim 11, wherein the multi-stage bleaching process is (C/A)(OX)$D_1E_2$(C/A).

15. The method of claim 11, wherein the multi-stage bleaching process is (C/A)(OX)(C/A)$E_2$(C/A).

16. The method of claim 11, wherein the multi-stage bleaching process is (C/A)$E_1D_1$(OX)(C/A).

17. The method of claim 11, wherein the multi-stage bleaching process is $D_0E_1$(C/A)(OX)(C/A).

18. The method of claim 11, wherein the multi-stage bleaching process is (C/A)$E_1$(C/A)(OX)(C/A).

19. The method of claim 11, wherein the multi-stage bleaching process is (C/A)(OX)(C/A)(OX)$D_2$.

20. The method of claim 11, wherein the multi-stage bleaching process is (C/A)(OX)$D_1$(OX)(C/A).

* * * * *